(12) United States Patent
Chen et al.

(10) Patent No.: US 12,264,207 B2
(45) Date of Patent: Apr. 1, 2025

(54) WATER-RESPONSIVE MATERIALS AND USES THEREFOR

(71) Applicant: Research Foundation of the City University of New York, New York, NY (US)

(72) Inventors: Xi Chen, New York, NY (US); Rein V. Ulijn, New York, NY (US); Zhi-Lun Liu, New York, NY (US); Yi-Ren Wang, San Jose, CA (US); Daniela Kroiss, New York, NY (US); Haozhen Wang, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 1042 days.

(21) Appl. No.: 17/214,132

(22) Filed: Mar. 26, 2021

(65) Prior Publication Data

US 2021/0214469 A1 Jul. 15, 2021

Related U.S. Application Data

(63) Continuation-in-part of application No. 16/376,493, filed on Apr. 5, 2019, now Pat. No. 10,961,988.
(Continued)

(51) Int. Cl.
*C08B 37/00* (2006.01)
*B25J 9/00* (2006.01)
(Continued)

(52) U.S. Cl.
CPC ......... *C08B 37/0081* (2013.01); *B25J 9/0015* (2013.01); *B25J 9/1075* (2013.01);
(Continued)

(58) Field of Classification Search
CPC ............ C08B 37/0081; C08B 37/0063; C08B 37/006; B25J 9/0015; B25J 9/1075;
(Continued)

(56) References Cited

U.S. PATENT DOCUMENTS 2,384,168 A 9/1945 Hillery
3,430,441 A 3/1969 Adams
(Continued)

FOREIGN PATENT DOCUMENTS

JP 4483390 10/2005
JP 2010193534 9/2010
(Continued)

OTHER PUBLICATIONS

Milton R.J. Salton; Medical Microbiology; 1996; University of Texas Medical Branch; 4th Edition; Chapter 2 (Year: 1996).*
(Continued)

*Primary Examiner* — Jesse S Bogue
(74) *Attorney, Agent, or Firm* — Peter J. Mikesell; Schmeiser, Olsen & Watts, LLP

(57) ABSTRACT

A rotary engine that generates electricity using differences in relative humidity. A water-responsive material expands and contracts as water evaporates which drives the rotation of two wheels. The rotary motion drives an electrical generator which produces electricity. In another embodiment, the water-responsive material is used to actuate an artificial muscle of a robotic device.

17 Claims, 42 Drawing Sheets

Related U.S. Application Data

(60) Provisional application No. 63/161,190, filed on Mar. 15, 2021, provisional application No. 62/781,240, filed on Dec. 18, 2018, provisional application No. 62/653,844, filed on Apr. 6, 2018.

(51) Int. Cl.
*B25J 9/10* (2006.01)
*C09D 105/00* (2006.01)
*F03G 7/06* (2006.01)

(52) U.S. Cl.
CPC ............. *C09D 105/00* (2013.01); *F03G 7/06* (2013.01); *B25J 9/1095* (2013.01)

(58) Field of Classification Search
CPC ........ B25J 9/1095; C09D 105/00; F03G 7/06; F03G 7/061; C08L 1/02; C08L 89/00; C09J 105/00
See application file for complete search history.

(56) References Cited

U.S. PATENT DOCUMENTS

| | | | |
|---|---|---|---|
| 3,913,326 A | 10/1975 | Banks | |
| 4,019,325 A | 4/1977 | Murphy | |
| 4,236,377 A | 12/1980 | Weinert | |
| 4,281,513 A | 8/1981 | Johnson | |
| 4,598,550 A | 7/1986 | Abbott | |
| 4,938,026 A | 7/1990 | Goldstein | |
| 9,234,508 B2 * | 1/2016 | Sahin | H02N 1/08 |
| 10,415,550 B2 * | 9/2019 | Chen | C12N 1/20 |
| 11,603,827 B1 * | 3/2023 | Sahin | F03G 7/06 |
| 2008/0223042 A1 | 9/2008 | Wiesner | |
| 2016/0121546 A1 * | 5/2016 | Yao | B29C 64/106 |
| | | | 428/221 |
| 2017/0051728 A1 * | 2/2017 | Chen | F03G 7/0612 |

FOREIGN PATENT DOCUMENTS

| | | | | |
|---|---|---|---|---|
| WO | WO2010103326 | | 9/2010 | |
| WO | WO2012071426 | | 5/2012 | |
| WO | WO2015172067 | | 11/2015 | |
| WO | WO-2018089924 A2 * | | 5/2018 | ............. B05D 3/067 |

OTHER PUBLICATIONS

Chen, Xi; Scaling up nanoscale water-driven energy conversion into evaporation-driven engines and generators; Nature Communications | 6:7346; Jun. 16, 2015.

Cavusoglu, Ahmet-Hamdi; Potential for natural evaporation as a reliable renewable energy resource; Nature Communications | 8: 617; Sep. 26, 2017.

Chen, Xi; Bacillus spores as building blocks for stimuliresponsive materials and nanogenerators; Nature Nanotechnology | vol. 9 | Jan. 26, 2014.

Kuhner, Daniel; From cells to muropeptide structures in 24 h: Peptidoglycan mapping by UPLC-MS; Scientific Reports | 4 : 7494 | Dec. 16, 2014.

Chen, Jun; Micro-cable structured textile for simultaneously harvesting solar and mechanical energy; Nature Energy; Sep. 12, 2016.

Armon, Shahaf; Geometry and Mechanics in the Opening of Chiral Seed Pods; Science Mag; vol. 333; Sep. 23, 2011.

Wang, Wen; Harnessing the hygroscopic and biofluorescent behaviors of genetically tractable microbial cells to design biohybrid wearables; Wang et al., Sci. Adv. 2017;3: e1601984; May 19, 2017.

Shin, Beomjune; Hygrobot: A self-locomotive ratcheted actuator powered by environmental humidity; Shin et al., Sci. Robot. 3, eaar2629; Jan. 24, 2018.

Lv, Chao; Sensitively Humidity-Driven Actuator Based on Photopolymerizable PEG-DA Films; Adv. Mater. Interfaces 2017, 4, 1601002; Feb. 15, 2017.

Yang, Xiaohui; Moisture-Responsive Natural Fiber Coil-Structured Artificial Muscles; ACS Appl. Mater. Interfaces 2018, 10, 32256-32264; Aug. 30, 2018.

Kim; Shi Hyeong; Bio-inspired, Moisture-Powered Hybrid Carbon Nanotube Yarn Muscles; Scientific Reports | 6:23016 ; Mar. 14, 2016.

Ma, Mingming; Bio-Inspired Polymer Composite Actuator and Generator Driven by Water Gradients; Science Mag., vol. 339, Jan. 11, 2013.

Elbaum, Rivka; The Role of Wheat Awns in the Seed Dispersal Unit; Science Mag., vol. 315, May 11, 2007.

Arazoe, Hiroki; An autonomous actuator driven by fluctuations in ambient humidity; Nature Materials | vol. 15 Oct. 2016.

Cheng, Huhu; One Single Graphene Oxide Film for Responsive Actuation; ACS Nano 2016, 10, 9529-9535; Sep. 16, 2016.

Vollmer, Waldemar; Peptidoglycan structure and architecture; FEMS Microbiol Rev 32 (2008) 149-167; Jan. 8, 2008.

Desmarais, Samantha; Isolation and Preparation of Bacterial Cell Walls for Compositional Analysis by Ultra Performance Liquid Chromatography; J. Vis. Exp. (83), e51183, Jan. 15, 2014.

Haines, Carter, Artificial Muscles from Fishing Line and Sewing Thread; Science Mag., vol. 343, Feb. 21, 2014.

Vollmer, Waldemar; Architecture of peptidoglycan: more data and more models; Trends Microbiol 18, 59-66, Jan. 8, 2010.

Atrih, A. et al.: Structural Analysis of Bacillus subtilis 168 Endospore Peptidoglycan and Its Role during Differentiation; Journal of Bacteriology; Nov. 1996; pp. 6173-6183; vol. 178, No. 21.

* cited by examiner

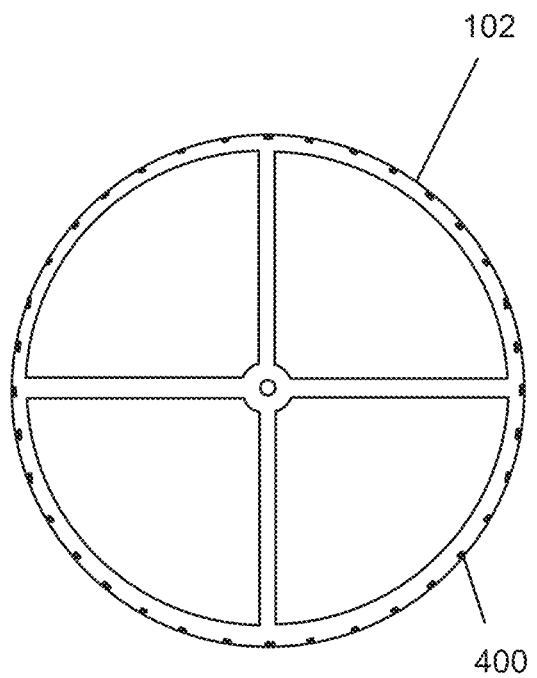
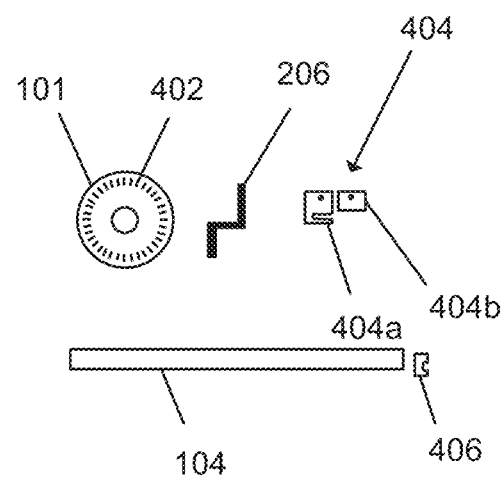
FIG. 4

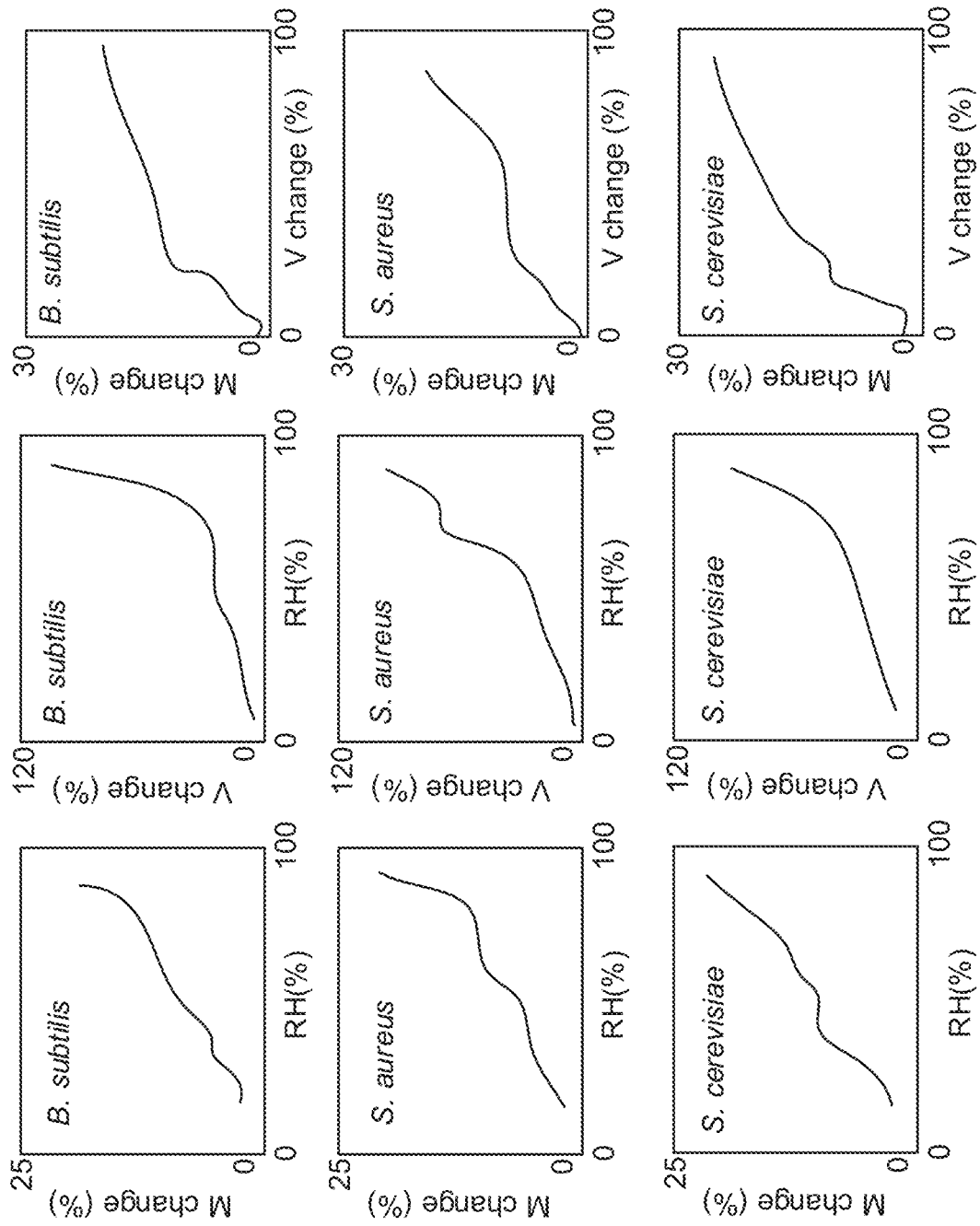

■ NAM
☐ NAG
— Peptide stem

B. subtilis spore

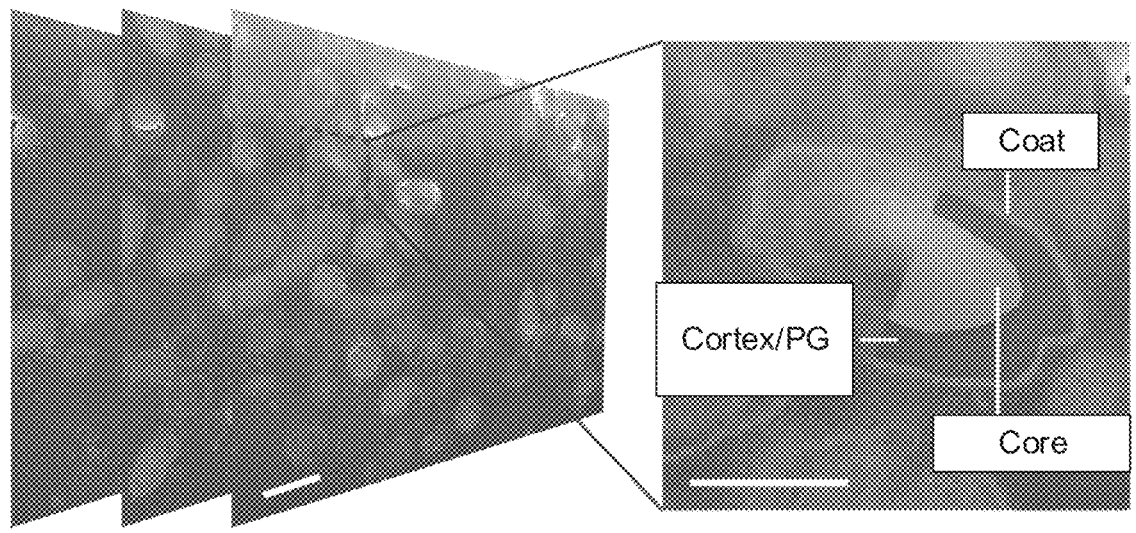
FIG. 15B     FIG. 15C
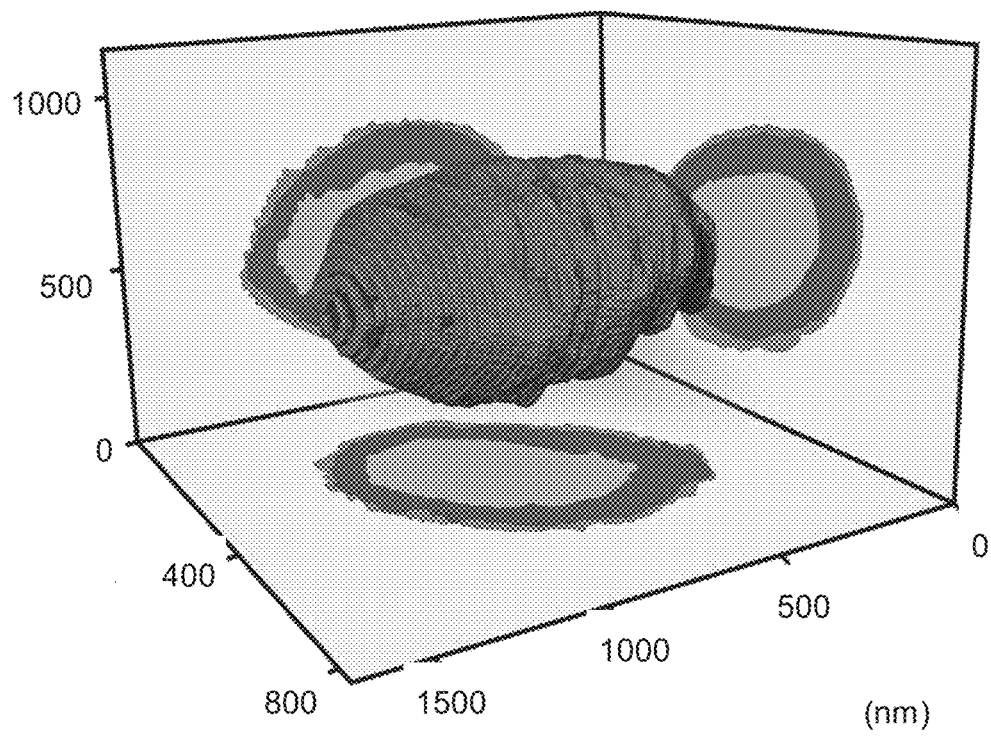
FIG. 15D

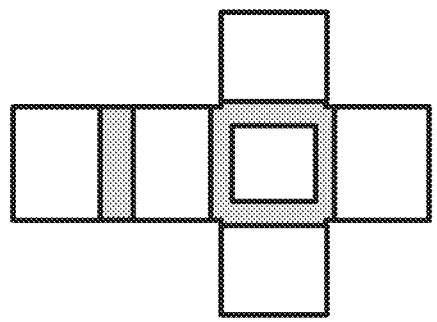
PG (front)
FIG. 18B
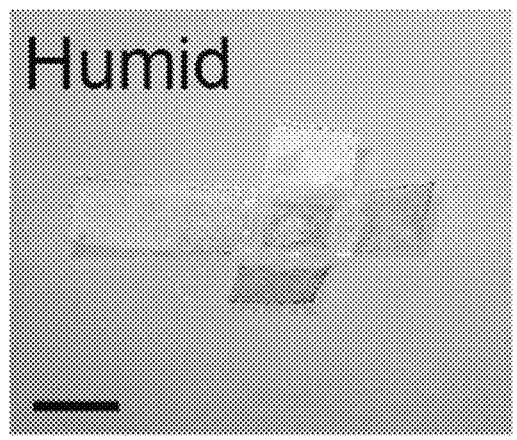
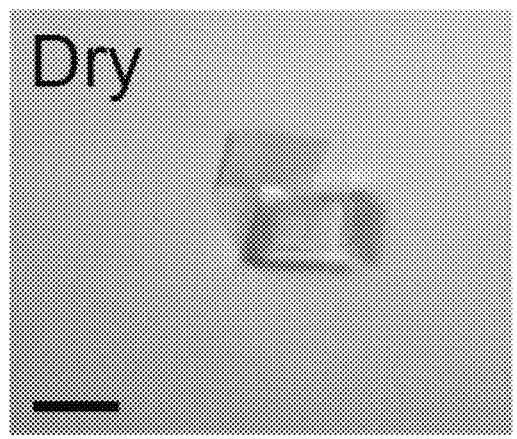
FIG. 18C

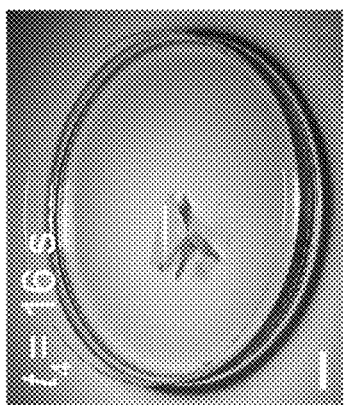
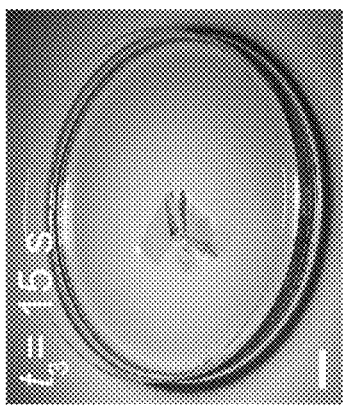
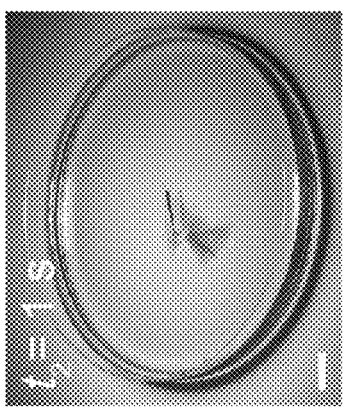
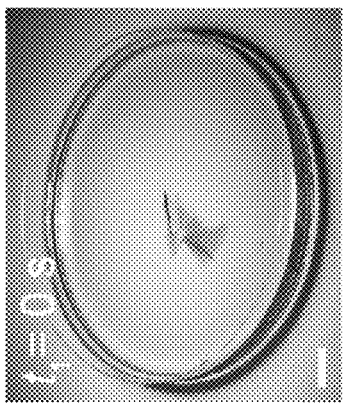
FIG. 18F

WATER-RESPONSIVE MATERIALS AND USES THEREFOR

CROSS-REFERENCE TO RELATED APPLICATIONS

This application claims priority to, and is a continuation-in-part of, U.S. patent application Ser. No. 16/376,493 (filed Apr. 5, 2019) which is a non-provisional of U.S. patent applications 62/653,844 (filed Apr. 6, 2018) and 62/781,240 (filed Dec. 18, 2018). This application also claims priority to Untied States patent application 63/161,190 (tiled Mar. 15, 2021). The content of these applications is hereby incorporated by reference.

STATEMENT OF FEDERALLY SPONSORED RESEARCH OR DEVELOPMENT

This invention was made with Government support under grant number N00014-18-1-2492 awarded by the Office of Naval Research (ONR). The government has certain rights in the invention.

BACKGROUND OF THE INVENTION

The subject matter disclosed herein relates to the production of energy using renewal green sources. In another embodiment, the subject matter relates the actuation of a robotic appendage using an artificial muscle.

The human need for sources of electrical energy is consistently increasing. At the same time, concerns related to fossil fuels and climate change have rendered many forms of electrical energy production less desirable. The green-energy industry has responded by developing additional methods of generating electricity that are more environmentally friendly.

One critical drawback of sources of green energy is the factor of environmental dependency. Hydroelectric powerplants need natural or human-constructed falls and dams. Photovoltaic cells need ample exposure to sunlight and windmills require strong winds. It would be desirable to provide additional methods for generating green energy and thereby expand the number of available options.

The discussion above is merely provided for general background information and is not intended to be used as an aid in determining the scope of the claimed subject matter.

SUMMARY

A rotary engine that generates electricity using differences in relative humidity (a relative humidity gradient). A water-responsive material expands and contracts as water evaporates which drives the rotation of wheels. The rotary motion drives an electrical generator which produces electricity. In another embodiment, the water-responsive material is used to actuate an artificial muscle of a robotic device.

In a first embodiment, a rotary engine is provided. The rotary engine comprising: an inner wheel having a first diameter and a first center; an outer wheel having a second diameter and a second center, wherein the second diameter is larger than the first diameter, wherein the inner wheel is disposed within the circumference; a crank with a first rod and a second rod, wherein the first rod and the second rod are non-aligned, the first rod passing through the first center and the second rod passing through the second center; a water-responsive material tensioned between the inner wheel and the outer wheel, wherein the water-responsive material is attached to (1) an outer circumference of the inner wheel and (2) an inner circumference of the outer wheel; a hood that at encloses at least a portion of an area of the outer wheel, but less than 100% of the area; and an electrical generator operatively connected to the inner wheel such that rotary motion of the inner wheel generates electricity.

In a second embodiment, an artificial muscle is provided. The artificial muscle comprising: A tube with a surface that is coated with a peptidoglycan, wherein humid air contacting the peptidoglycan causes hygroscopic expansion and contraction of the peptidoglycan, thereby actuating the tube.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 4 illustrates parts of the rotary engine;

FIG. 12A depicts graphs showing mass change of PG when RH varies from 10% to 90%;

FIG. 12B depicts volume change of PG when RH varies from 10% to 90%;

FIG. 12C depicts the relationship of PG's mass change vs volume change during a hydration process;

FIG. 15B and FIG. 15C are serial cross-section SEM images of spores (FIG. 15B, scale bar 1 μm), showing the spatial distribution of a spore's major layers (FIG. 15C, scale bar 500 nm), FIG. 15ID is a reconstructed three-dimensional map based on FIG. 15B and FIG. 15C;

FIG. 18B and FIG. 18C illustrate a precut Mylar film with patterned PG/adhesive composites folds itself into a cube when exposed to a dry environment. Scale bar, 5 mm;

FIG. 18F depict a 2D origami boat unfolding itself to a 3D structure and floats when it touches water. Scale bar, 10 mm;

DETAILED DESCRIPTION OF THE INVENTION

As a source of clean renewable energy evaporation is not a common topic. Despite its ubiquitous nature little has been done to apply ambient environmental conditions to drive an engine with water-evaporation. The phenomenon of water responsiveness can be seen in nature with hygroscopic materials. As a humidity differential is applied to these materials they expand and contract in response. High humidity allows them to absorb moisture from the environment and extend, while low humidity causes moisture to be lost and results in contraction.

This disclosure pertains, in one embodiment, to water-responsive materials used to construct rotary engines that can operate on bodies of water and harvest evaporation energy. These engines generate rotary motion and electricity by utilizing evaporation energy. The power output of these engines is comparable to that of state-of-the-art solar power plants, but the capital and operating cost of these engines is much lower. In addition, these engines easily scale for large-scale applications. The rotary engine can operate purely on the energy contained within passively-evaporating water; that is, water that will evaporate under ambient conditions without a drastic change in pressure or temperature, such as conditions involved with boiling water. As used in this specification, the phrase "water-responsive" means the material expands or contracts upon exposure to a change in relative humidity.

Figure 1:
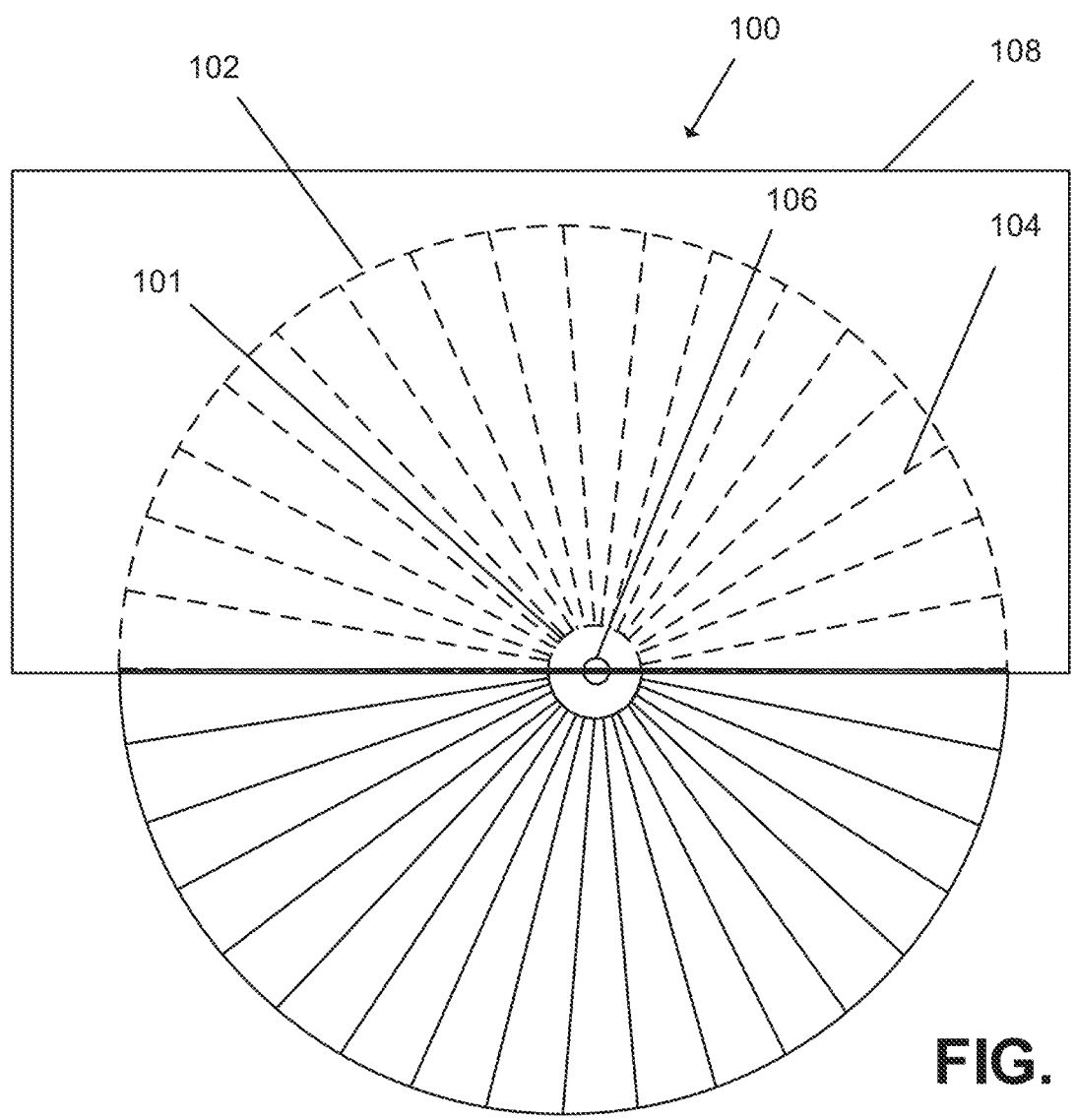
FIG. 1 is a schematic top view of the general structure of a rotary engine.

FIG. 1 shows a top view of the general structure of the rotary engine 100. The rotary engine 100 is comprised of an inner wheel 101 and an outer wheel 102 which are of different diameters. Ball bearings 106 are installed at the centers of the wheels 101, 102 to minimize friction loss. The center 210 of the inner wheel 101 (which has a diameter that is smaller than that of the outer wheel 102) is some distance 200 (see FIG. 2) away from the center 212 of the outer wheel 102. This distance is dependent on the type of water-responsive material being used to form filaments 104. The filaments 104 are attached between the inner wheel 101 and the outer wheel 102. In one embodiment, there are between tens and thousands of filaments (e.g. 10 to 10,000 filaments). A hood 108 is made to create a humidity gradient between a proximate end 202 and a distal end 204 of the outer wheel 102. The hood 108 places a first portion 204' (e.g. half) of the rotary engine 100 in a relatively high RH environment and a second portion 202' of the rotary engine 100 in a relatively low RH environment.

In one embodiment, the rotary engine 100 comprises a lightweight extruded acrylic wheel 102 with a small acrylic wheel 101 near its geometric center. Water-responsive cellulose filaments 104 are attached around the circumference of the inner wheel 101, which radiates outward and connects to the outer wheel 102. In the embodiment of FIG. 1, there are support shafts (e.g. metal support shafts) to provide added stability, so the filaments 104 are each given an initial tension in order to "balance" the inner wheel 101 near the center of the outer wheel 102.

Figure 2:
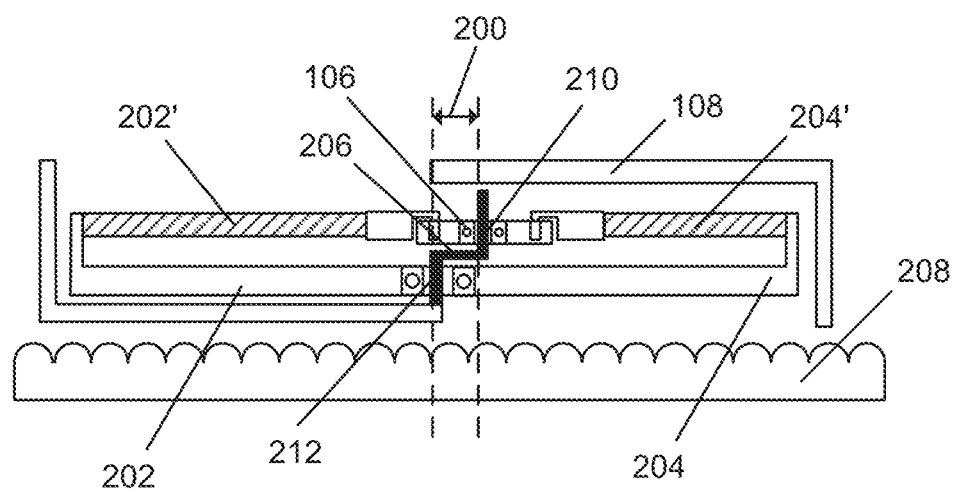
FIG. 2 is a schematic side view of the general structure of the rotary engine.

FIG. 2 depicts a side view of the rotary engine 100. A non-aligned two-rod crank 206 holds the inner wheel 101 and the outer wheel 102 in place. The hood 108 lets the whole rotary engine 100 float on a body of water 208 and creates a humidity gradient across the rotary engine 100.

Figure 3:
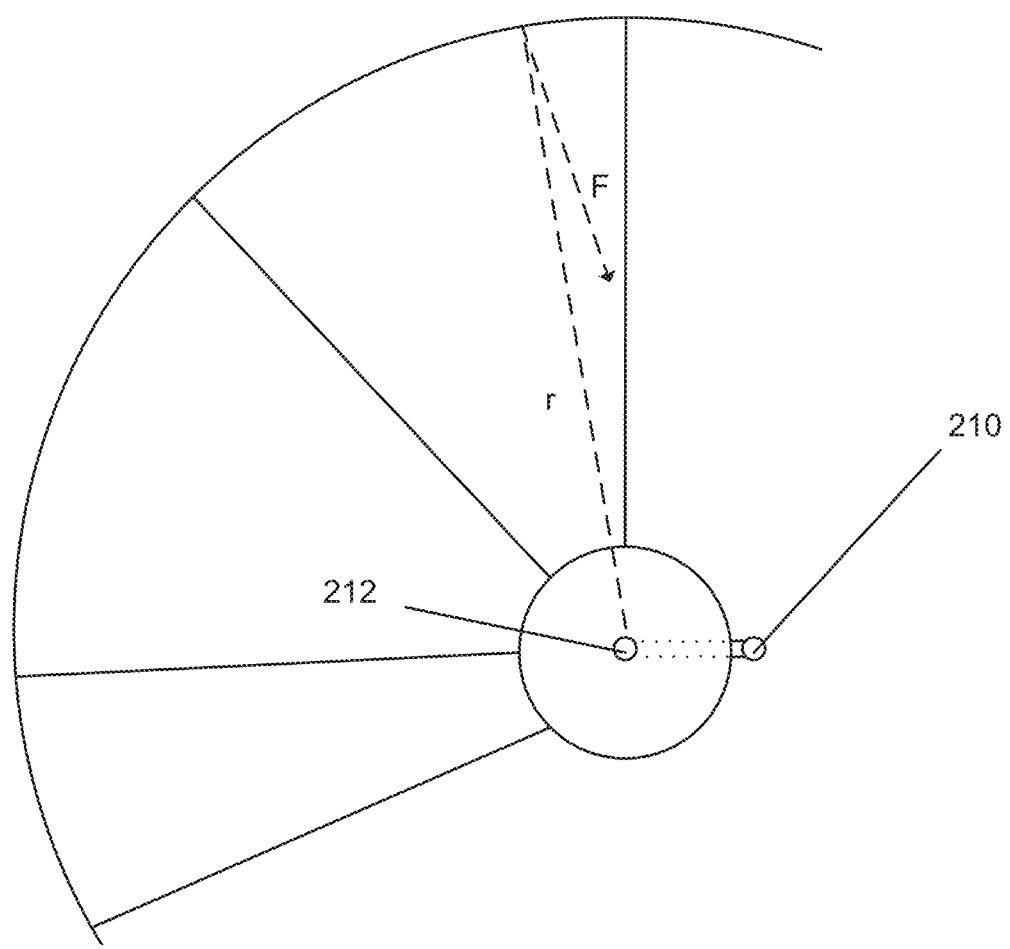
FIG. 3 is a force diagram of the rotary engine.

FIG. 3 depicts a force diagram of the rotary engine 100. The part of the wheel shown is placed in a low RH environment, which makes the filaments shrink. One of the filaments is taken as an example. All filaments shown can be interpreted in the same manner. Owing to the shrinkage, the filament pulls the larger diameter of the larger wheel toward the center of the smaller wheel. The radius of the larger wheel serves as a lever arm. The torque is obtained by the cross product of force and the lever arm vectors, which is shown in Equation 1.

$$\tau = F \times r \quad (1)$$

where $\tau$ stands for torque, F stands for force and r stands for lever arm.

In one embodiment, many of the components may be made of acrylics or cellophane which were processed by a laser cutter. The drawing of each component is shown in FIG. 4. The following are the design concepts for each part.

The inner wheel 101 is the part to which the filaments 104 are attached. A ball bearing is installed at the center of the inner wheel 101 to minimize friction loss. The slits 402 are for hooks 406. Outer wheel 102 is the large wheel to which water-responsive filaments 104 (for example, cellulose filaments or other water-responsive materials or actuators, such as silk, peptidoglycan, hydrogels, and proteins) are attached. In one embodiment, the filaments 104 are biodegradable filaments which, coupled with the rotary engine's pollution-free energy transformation, allows the eventual minimization of carbon footprint to supersede the already minimal footprint for manufacturing of the rotary engine 100. The ball bearing 106 is installed at the center of the outer wheel 102 to minimize friction loss. The cuts in the rim of the outer wheel 102 are slits 400 for hooks 404. The non-aligned two-rod crank 206 is for connection of the inner wheel 101 and the outer wheel 102. This non-aligned two-rod crank is inserted through the respective centers of the ball bearings of the inner wheel 101 and the outer wheel 102. Hooks 404 are provided to clamp filaments 104 to the outer wheel 102. In one embodiment, there are thirty-six pairs of hooks 404. The hooks 404 are inserted to the slits 400 on the outer wheel 102. The hook 404 comprises two plates 404a, 404b that are squeezed together by screws and nuts to affix the filaments 104. Filaments 104 are also depicted. In one embodiment, there are thirty-six filaments 104.

Hooks 406 are provided to attach the filaments at slits 402 of the inner wheel 101. In one embodiment, there are thirty-six pairs of hooks 406. The hook 406 may be, for example, made of cardboard and may be glued to the filaments 104.

Figure 5A:
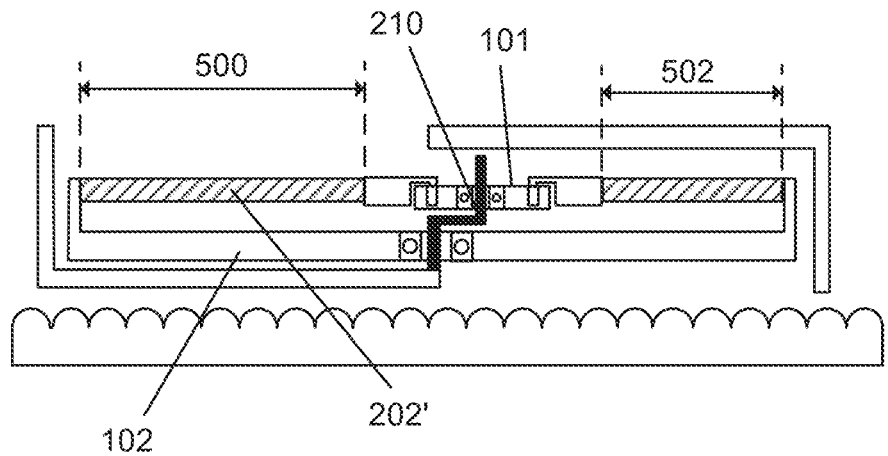
FIG. 5A is a cross section side view of a rotary engine.

As a proof of concept, a humidity difference was produced artificially using moist napkins. Absorbent materials (e.g. a napkin) were fixed to the hood 108. RH in the hood 108 was increased by adding water onto the napkins. To adjust the tension in each filament 104, a spring balance was used to pull the filaments at a specific position of the lager wheel while the filaments 104 were tensioned. In this proof of concept, the filaments 104 were pulled with 0.1 N at the short end 502 of the wheel (see FIG. 5A). The center 210 of inner wheel 101 shifts to one end, which makes the long end 500. The short end 502 is opposite the long end 500 with regard to the diameter of the outer wheel 102.

Figure 5B:
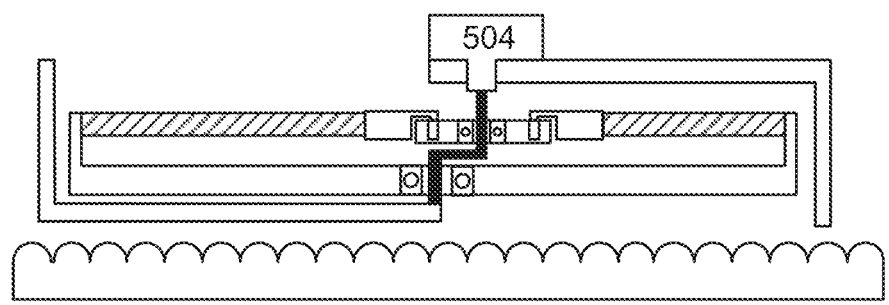
FIG. 5B is a cross section side view of a rotary engine with an electricity generator attached.

As shown in FIG. 5B, coupling the rotary engine 100 with electricity generator 504(e.g. a dynamo system) can be a new sustainable power generation technique. This new technique to generate electricity has many advantages over traditional electricity generator as well as other existing sustainable energy generator. In traditional power plants, combustion of fuels can have detrimental effects on environment. Solid waste and by-products generated in the electricity generating process can harm the environment permanently. Traditional ways of generating electricity liberate the trapped carbon elements to the atmosphere, boosting the greenhouse effect. The social cost of generating electricity by traditional methods is immeasurable. On the other hand, energy offered by windmills and solar plants is intermittent and limited by the environment. Energy storage systems are required to save the energy, which decreases energy efficiency.

Figure 6:
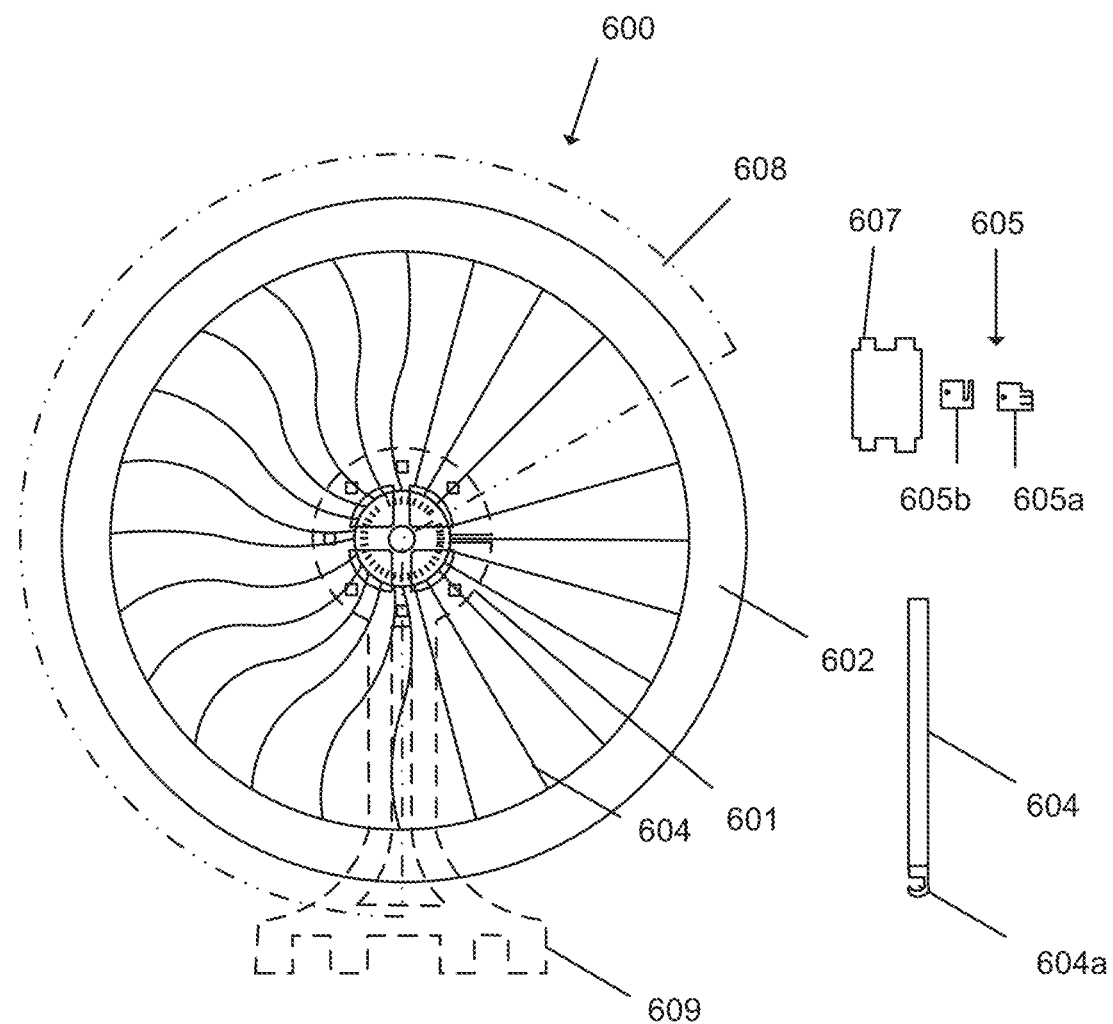
FIG. 6 is a side view of a vertical rotary engine.

In the embodiment of FIGS. 1-5B, the rotary engine 100 is in a horizontal position. FIG. 6 depicts a side view of a rotary engine 600 that is in a vertical position. The vertical rotary engine may be disposed perpendicular with respect to the surface of a body of water. The rotary engine 600 has filaments 604 as spokes, mounted inside a hood 608 held in place by a stand 609. Spacer 607 is pegged connector that bridges the front of the hood 608 to the back of the hood 608 and defines the width of the rotary engine 600. Hooks 605 are used to connect the filaments 604 to an outer wheel 602. A three-pronged peg 605*a* is placed through corresponding holes in the outer wheel 602 and the plate 605*b* is slid through the face of the outer wheel 602. They sandwich the filaments 604 in place. A screw is then inserted through the peg 605*a* and plate 605*b* and an appropriate nut is used to hold them tight in place. For illustrative purposes a filament 604 is shown that is attached to a hook 604*a*. The hook 604*a* can be used to attach the filament 604 to an inner wheel 601 while the filament's other end is attached to the outer wheel 602.

After selecting appropriate dimensions of the inner wheel 601 and outer wheel 602 it is possible to determine the dimensions of the hood 608, mounting stand 609, spacer 607, three-pronged pegs 605*a* and plate 605*b* In one embodiment, the filaments 604 were cut to 4.125 inches. Twenty-four filaments were connected at 15-degree increments about the inner wheel 601 and the two wheels were cut to the following specifies—outer wheel 602: 9.5" OD, 8" ID; inner wheel 601 1.375" OD, 0.375" ID. In one embodiment, the outer wheel has a diameter that is between three times (3×) and seven times (7×) the diameter of the inner wheel. In one such embodiment, the outer wheel has a diameter that is between 4.5× and 5.5× the diameter of the inner wheel.

Figure 7A:
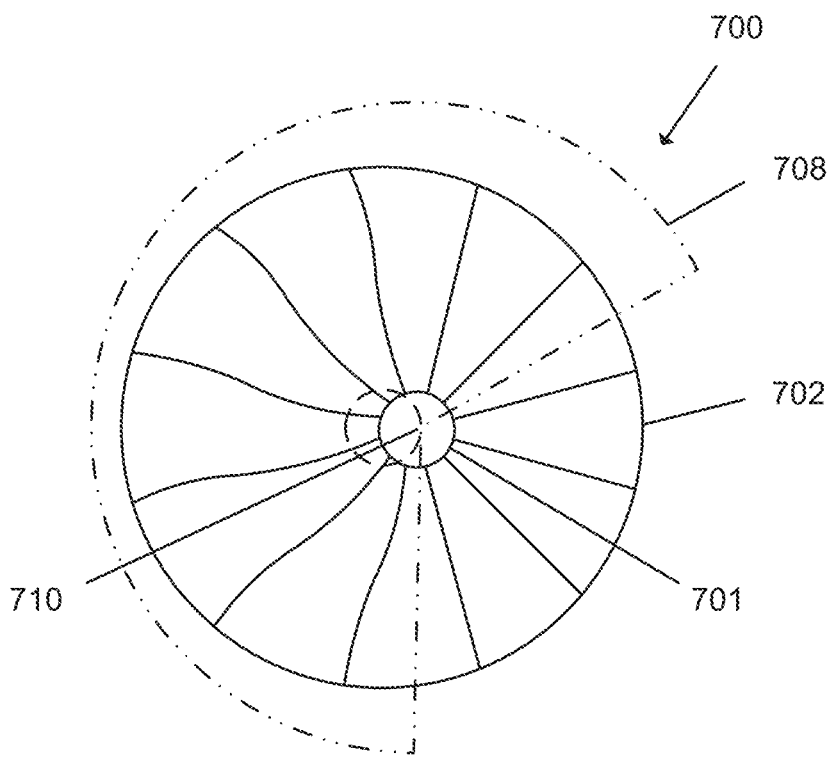
FIG. 7A and FIG. 7B are schematic diagrams of a rotary engine in action.
Figure 7B:
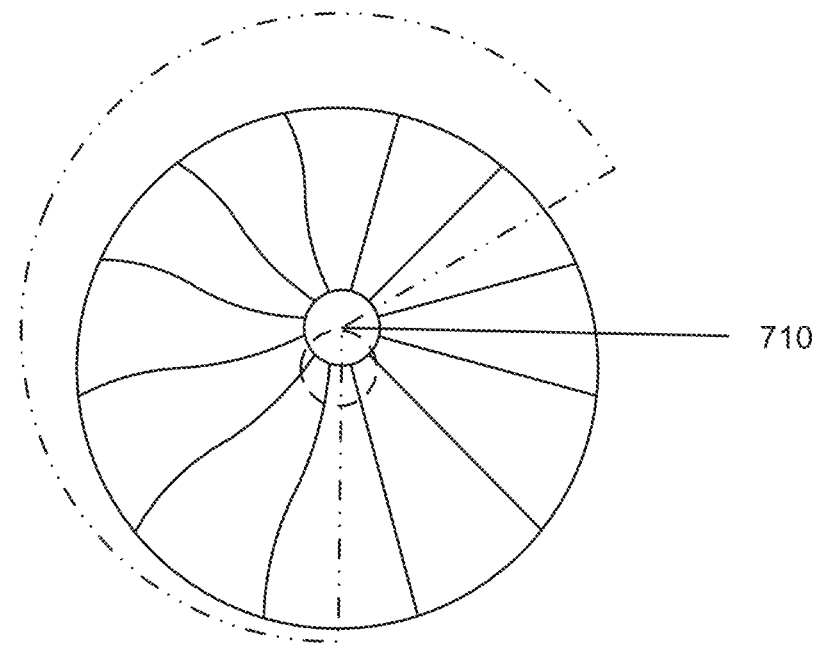

FIGS. 7A and 7B depict a rotary engine 700 in action. The rotary engine 700 comprises an inner wheel 701 (with a first center 710) and an outer wheel 702 (with a second center 712). In those embodiments in which the rotary engine is a vertical rotary engine, the first center 710 may be attached to a stand, such as stand 609 of FIG. 6. A hood 708 encloses at least a portion of the outer wheel 702. In the embodiment of FIG. 7A, between 50% and 75% of the surface area of the outer wheel 702 is enclosed to define a high RH volume. In one embodiment where cellulose filaments are used, the hood 708 is cut to accommodate 66% of the outer wheel 702. This is due to the experimental finding that dehydration of cellulose filaments (Cellophane PT 300) happens about three times faster than hydration. The inner wheel 701 is held in place, inside the hood, with a metal rod that functions as an axel. The un-enclosed area of the outer wheel 702 defines a low RH volume. As the filaments become tensioned and un-tensioned due the evaporation of water, the rotary engine 700 of FIG. 7A rotates in a counter-clockwise direction. This moves the first center 710 from a first rotary position shown in FIG. 7A to a second rotary position shown in FIG. 7B.

When generating electricity using the disclosed rotary engines, the social cost can be infinitesimal. The operating condition of the rotary engine is under ambient temperature and pressure and there are very limited by-products, which dramatically reduces the impact to environmental systems. The rotary engine can operate on any body of water. Strikingly, drier environments happen to possess better conditions for harvesting evaporation energy. This technique is revolutionary because the energy harvesting is not intermittent, and water can be served as a natural energy capacity, which preserves the energy conversion efficiency.

The disclosed evaporation-driven engine can be placed in almost any environment at any time of the day and still have a measurable energy output. Albeit, certain environmental conditions are helpful for maximized performance, the rotary engine will nevertheless work under almost any condition given an appropriate humidity gradient. If the ambient temperature is high enough to allow evaporation from a reservoir into the hood and the ambient water moister content is relatively low, the rotary engine would work best. However, the rotary engine will also work under contingent ambient conditions. The ease of assembly and maneuverability of the rotary engine also helps with environmental versatility, as the rotary engine could easily be moved to a new location for optimized performance.

The rotary engine also helps reduce the rate of evaporation of water. In places like California, where drought is apparent, would benefit from a minimization of water loss through surface evaporation. Small bodies of inland freshwater provide an appropriate platform to stage a scaled-up version of the rotary engine. Instead of allowing the reservoir to dry up and provide no beneficial result, the rotary engine can use the available energy in evaporating water and translate it into usable electrical energy. As the evaporated water from the reservoirs is passively channeled into a high RH hood, further means can be easily installed to allow the excess vapor in the hood to be led back into the reservoir through condensation. Eventually, when the freshwater does dry up, the rotary engine can be easily deconstructed and moved to a new location for repeated use. Thus, the loss of water through surface evaporation is lowered.

With evaporation being a central phenomenon in nature, scaling up the rotary engine would enable it to perform various tasks. Some tasks include (1) used as a substitute to fossil fuel power plants and (2) used as a substitute for automobile engine. Additionally, if scaled up, the device can be used to generate the electricity needed to power motors of small automated vehicles. The clean, renewable energy available for this engine would help reduce pollution caused by internal combustion engines. The device can be used to directly obtain mechanical work. A good example would be attaching the axel of the evaporation engine to wheels.

Some other devices utilize technology that is at least somewhat similar to the technology described in this disclosure but the previous technology relies on bacteria-coated polyimide tapes. In contrast, the filaments of the disclosed rotary engine are bacteria-free in that no addition bacteria has been coated on the filaments beyond those that are present on the surfaces of virtually all objections. This gives the disclosed filaments properties that are dissimilar to the properties of the bacteria-coated polyimides. For example, the filaments extend approximately 7% past their initial length over a two-minute interval when relative humidity is altered from ~10% to ~85%.

Peptidoglycan (PG) as a Water-Responsive Material

Many water-responsive materials are known to suffer from small-scale responsive locomotion and relatively low energy output, which impede their effective utility. The following disclosure demonstrates peptidoglycan (PG), which is the main component of bacterial cell wall, dramatically and reversibly deform driven by varying local humidity. The steady-state strain of PG can reach 30% and dynamic responsive time is less than one second. PG has extraordinary mechanical property with a high Young's modulus up to 5 GPa. The energy density of PG can reach 140 MJ per $m^3$, which is higher than all existing humidity responsive material. A reversibly bending actuator was further prepared to demonstrate an example of an actuator and/or energy harvesting application. The mechanical energy density of peptidoglycan exceeds that of all other existing actuators and artificial muscles. This makes it an excellent building block for better actuators for broad applications. Such applications include energy harvesting, as described elsewhere in this specification, and artificial muscles.

Peptidoglycan, also known as murein, is a biopolymer naturally found in bacteria cell walls. It is aligned along the cell wall in a shell-liked structure, which provides rigidity to bacteria. Peptidoglycan is a water-responsive material that can shrink and swell in response to changes in relative humidity (RH). During this hydration and dehydration processes, its energy density is higher than that of all existing actuators and artificial muscles. Disclosed herein is a method for using peptidoglycan as a building block for high energy density water-responsive materials. Peptidoglycan can be mixed with other formula as a composite or stand-alone material. The actuation of the water-responsive materials can be transferred to other kinds of energy with various designs. For example, they can be used as an actuator and generate rotational movement, translational movement, expansion, contraction or any combination of these movements. Their mechanical actuation could also be converted to electricity when connected to an electric generator. Owing to the high reversibility, short responsive time, and high energy density, peptidoglycan is excellent for many potential applications such as robotics, biotechnology, medical devices, transportation, manipulations, power generation, energy storage systems, smart textile design, pumping systems, humidity sensors, etc.

The development of modern robotics is largely limited by the performance of artificial muscles. The remarkably high energy density of peptidoglycan can lead to the next generation artificial muscles that improve the performance of existing robotic systems and enable new designs. For example, the peptidoglycan based artificial muscles require less energy to produce the same amount of work, which can significantly extend the uptime of a robot. The hygroscopic expansion and contraction of the peptidoglycan is transferred to a secondary movement (e.g. rotational movement, expansion, contraction or a combination thereof). The expansion and contraction can be achieved by connecting artificial muscles to each other in series and forming a linear actuator. The rotational movement can be achieved by connecting the artificial muscle to a slider-crank linkage.

Figure 8:
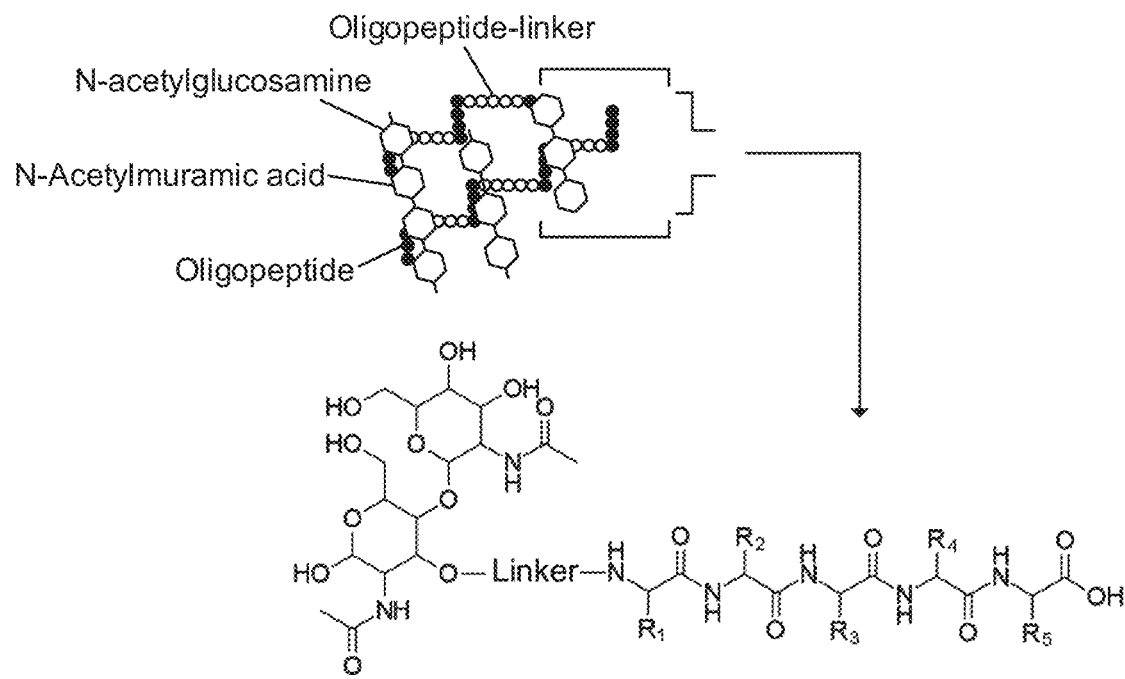
FIG. 8 depicts the structure of peptidoglycan and its monomer.

Referring to FIG. 8 and Table 1, the structure of peptidoglycan differs among different bacterial strains; however, it follows a general pattern. The building blocks of peptidoglycan can be broken down to disaccharides comprising N-acetyl-muramic acid (NAM) and N-acetyl-glucosamine (Mur-Nac), and a peptide stem, formed by up to five amino acids. A monomer of the disaccharide attached to a peptide stem is called a muropeptide. The sugar component is composed of alternating residues of the two saccharides, which are linked via β-(1,4)-glycosidic bonds. The peptide moiety is attached to two N-acetyl-muramic acid residues of separate saccharide-strands, thereby crosslinking the two strands. This leads to the formation of a three-dimensional mesh-like polymer. In most cases, there are variations between the peptide stem or in the way of cross-linking. Other suitable crosslinkers include glutaraldehyde, O,O'-Bis [2-(N-Succinimidyl-succinylamino)ethyl]polyethylene glycol, and BS(PEG)9 (PEGylated bis(sulfosuccinimidyl)suberate).

TABLE 1

Amino acid variations in the peptide stem

| Position | Residue encountered | Examples |
|---|---|---|
| $R_1$ | L-Ala | Most species |
| | Gly | *Mycobacterium leprae, Brevibacterium imperiale* |
| | L-Ser | *Butyribacterium rettgeri* |
| $R_2$ | D-Isoglutamate | Most Gram-negative species |
| | D-Isoglutamine | Most Gram-positive species, Mycobacteria |
| | threo-3-Hydroxyglutamate | *Microbacterium lacticum* |
| $R_3$ | mseo-$A_2$pm | Most Gram-negative species, Bacilli, Mycobacteria |
| | L-Lys | Most Gram-positive species |
| | L-Orn | Spirochetes, *Thermus thermophilus* |
| | L-Lys/L-Orn | *Bifidobacterium globosum* |
| | L-Lys/D-Lys | *Thermotoga maritima* |
| | LL-$A_2$pm | *Streptomyces albus, Propionibacterium petersonii* |
| | meso-Lanthionine | *Fusobacterium nucleatum* |
| | L-2,4-Diaminobutyrate | *Corynebacterium aquaticum* |
| | L-Homoserine | *Corynebacterium poinsettiae* |
| | L-Ala | *Erysipelothrix rhusiopathiae* |
| | L-Glu | *Arthrobacter* J. 39 |
| | Amidated meso-$A_2$pm | *Bacillus subtilis* |
| | 2,6-Diamino-3-hydroxypimelate | *Ampuraliella regularis* |
| | L-5-Hydroxylysine | *Streptococcus pyogenesz* |
| | N'-Acetyl-L-2,4-diaminobutyrate | *Corynebacterium insidiosum* |
| $R_4$ | D-Ala | All bacteria |
| $R_5$ | D-Ala | Most bacteria |
| | D-Ser | *Enterococcus gallinarum* |
| | D-Lac | *Lactobacillus casei*, Enterococci with acquired resistance to vancomycin |

Existing protocols that were published previously are known to isolate the peptidoglycan (Kühner, D., Stahl, M., Demircioglu, D. D., & Bertsche, U. (2014) from cells to muropeptide structures in 24 h: peptidoglycan mapping by UPLC-MS. Scientific Reports, 4:7494).

Figure 9:
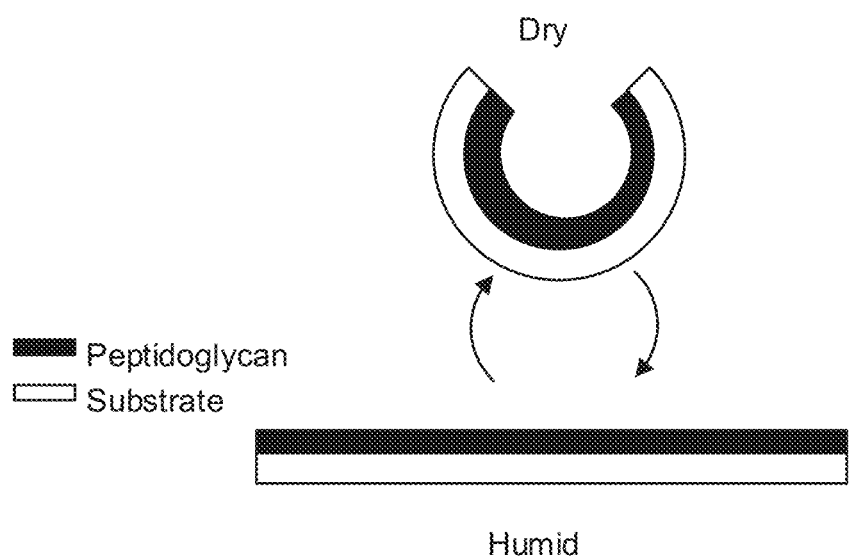
FIG. 9 illustrates peptidoglycan-based film changes curvature in response to changes in RH.

The water-responsive properties of peptidoglycan was tested by depositing the peptidoglycan on thin polymer substrates. The polymer substrate may, for example, have a thickness between 500 nm and 5 mm. Likewise, the peptidoglycan may have a thickness between 500 nm and 5 mm. The substrates serve as an energy density indicator; if the energy density is high, the substrate will transform a lot with different humidity level and vice versa. In this case, the substrate surface curves more when RH is low and flattens when the RH is high. A KAPTON® thin window film with 0.3 mil (8 μm) thicknesses were used as the substrates. The substrates are cut into 3 mm×5 mm rectangular pieces. To distribute peptidoglycan evenly on the surface, plasma treatment was performed on the substrates to enhance the adhesion force before peptidoglycan is deposited. The test solution is prepared by mixing peptidoglycan and distilled water. The thickness of the peptidoglycan layer on the substrate after evaporation of water is calculated to be approximately 3 μm. The prepared peptidoglycan-based water-responsive material curves when RH is low and flattens when RH is high. See FIG. 9. The curvature indicates high energy density of peptidoglycan extracted from E. coli.

Atomic force microscope (AFM) is used to measure the swelling rate of extracted peptidoglycan. Peptidoglycan from B. subtilis is also tested. A chamber was used to cover the AFM to create an environment in which the RH is adjustable. 15 μl of peptidoglycan is dripped onto an $SiO_2$ substrate and after the water on the substrate has evaporated, the volume change of peptidoglycan can be determined. Dry and moist air is blown onto the substrate at different times to create an environment of low or high RH, respectively. For the peptidoglycan from E. coli, the thickness on a specific point is 408.280 nm when RH is 6.4% and 454.387 nm when RH is 92% The swelling rate is 11.3% in this case. For the peptidoglycan from B. subtilis, the thickness on a specific point is 269.387 nm when RH is 5.1% and 359.346 nm when RH is 88%. The swelling rate is 33.5%.

Figure 10A:
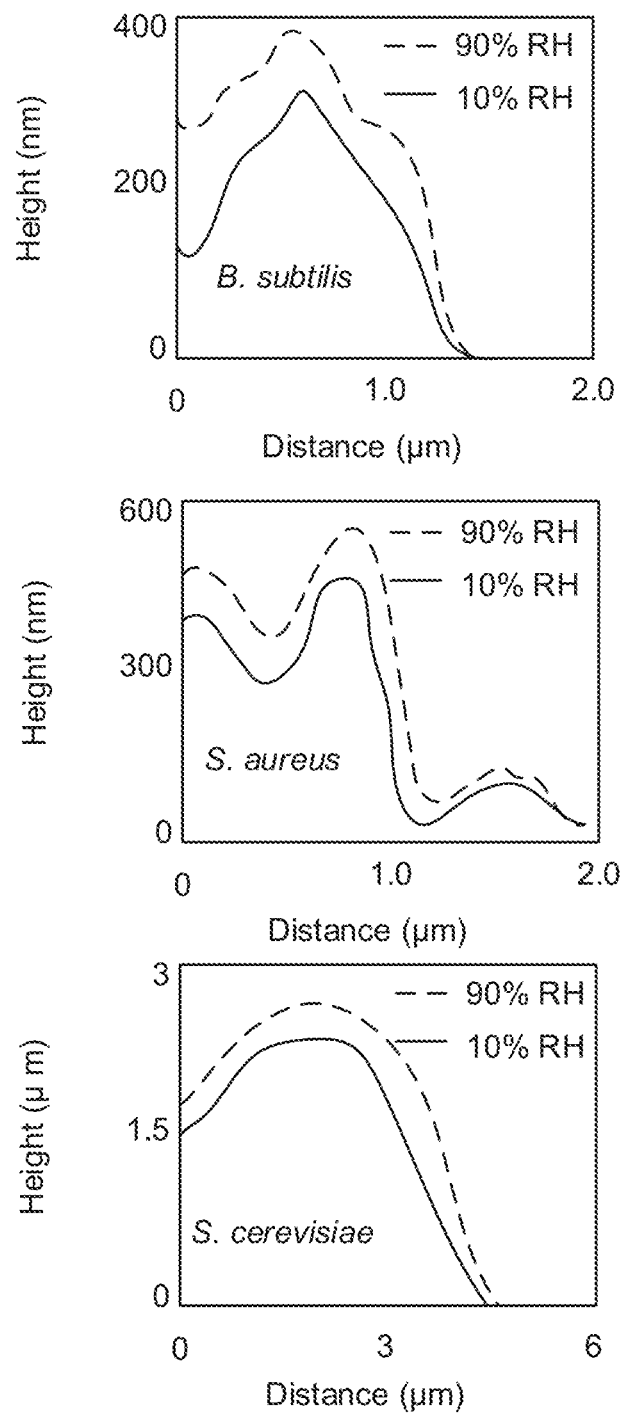
FIG. 10A depicts graphs of AFM sectional topographies of three PG, with thickness at 90% and 10% RH.
Figure 10B:
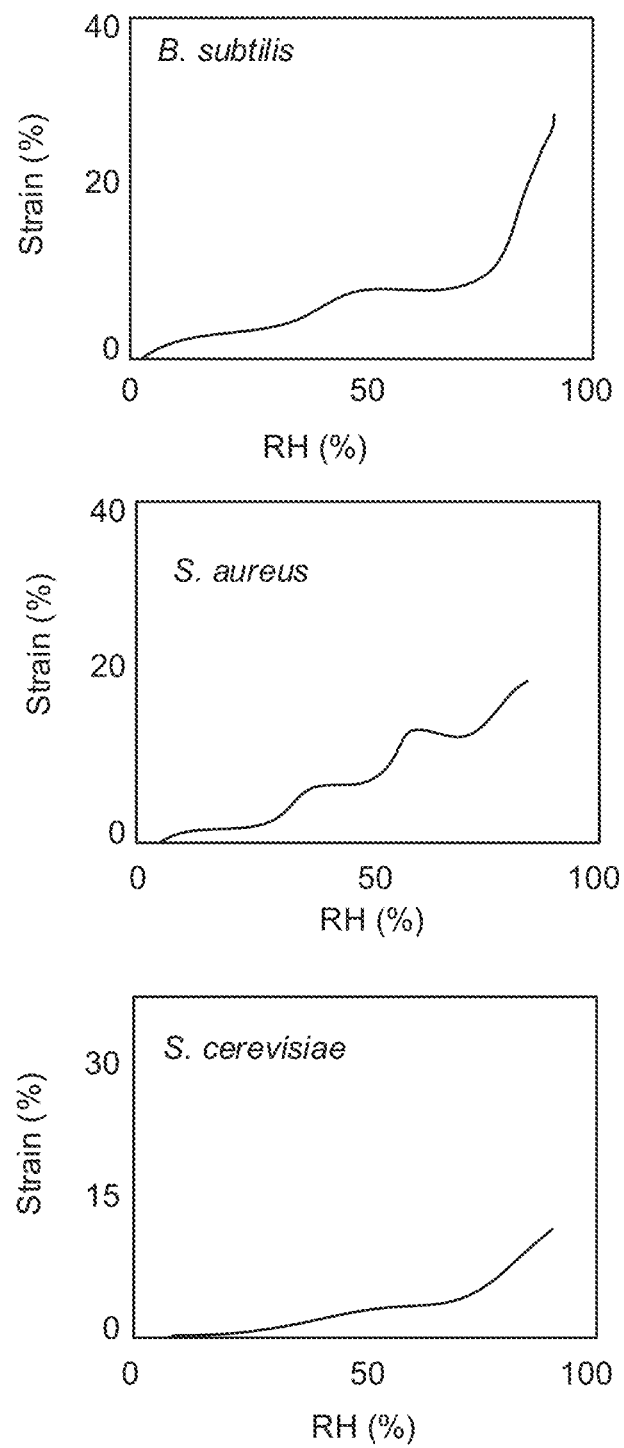
FIG. 10B depicts are graphs showing steady state strain of three PG films.

The PG existing in bacterial cell wall of B. subtilis, S. aureus and S. cerevisiae, was also studied because they all from gram-positive bacterial with thick multi-layer of PG. The water responsive steady-state strain of PG is carried out by dividing the vertical size change of PG with their original thickness, which can be characterized by AFM with changing RH in the chamber. The shift in RH from 10% to 90% with 10% steps is achieved by a customized humidity system. The AFM topographic images of PG was captured at each 10% RH level. The captured images at 10% RH and 90% RH showed that all three PG has significant expansion in time of increasing RH. By analyzing corresponding height profile of each image (FIG. 10A) and dividing the size change to PG's original thickness, water responsive steady-state strain of PG was obtained (FIG. 10B). According to FIG. 10B, there is a diversity in water responsive property between PG from difference bacterial cell wall. The largest responsive strain was gained by PG from B. subtilis, which is 27.2%. At the same time, both PG from S. aureus (191%) and S. cerevisiae (11.2%) has above 10% humidity responsive strain. Comparing this responsive strain to that of B. subtilis spore (about 12%), PG is assumed to be the major humidity responsive component of spore.

Figure 10C:
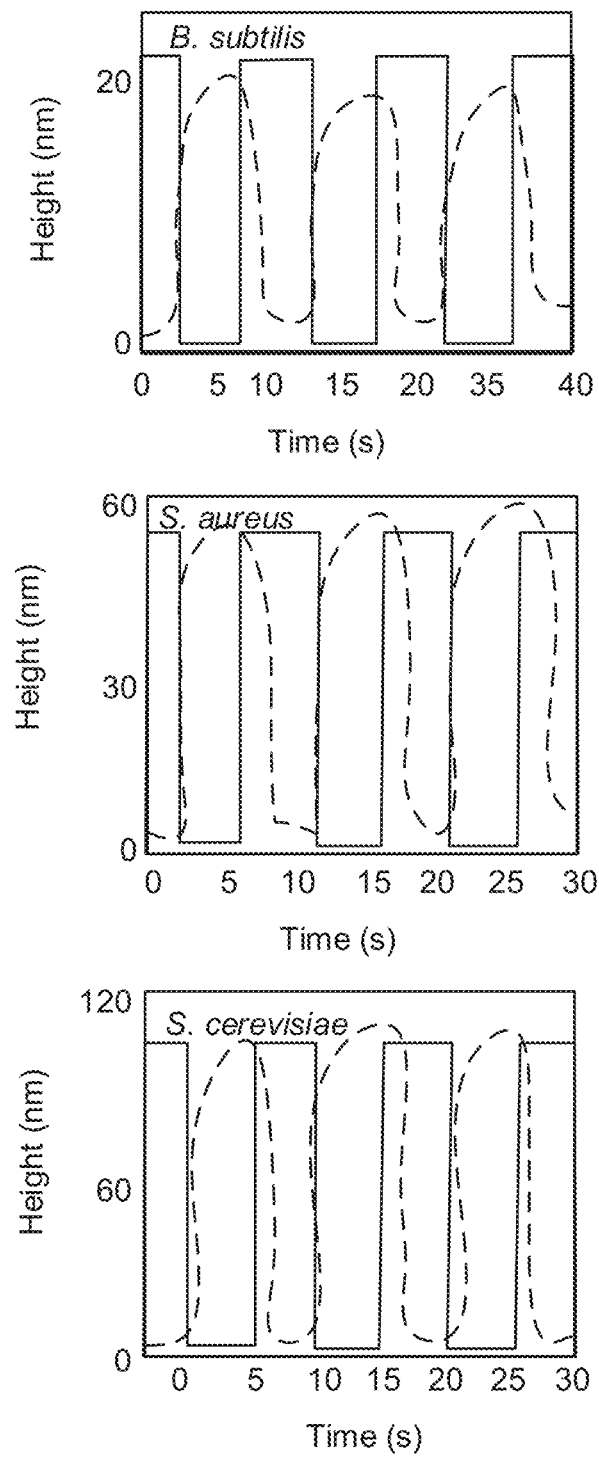
FIG. 10C' shows graphs depicting dynamic state height change of three PG showing their quick reaction to ambient RH.

In an additional experiment, two tiny air tubes were inserted into AFM chamber to make local RH at PG achieve abruptly change. The air tubes were connected with a solenoid valve, which is capable of switching dry air and humidity air. By applying square wave digital signal to the valve, the dynamic humidity cycles were obtained (FIG. 10C). Responding to the abruptly changing humidity, PG's dynamic deformation on the vertical direction is reflected by the Z-piezo signal of AFM. The Z-piezo signal was monitored by extracting output signal of AFM directly and reading in a customized LABVIEW® program. As shown in FIG. 10C, real time expansion of PG response to fast-changing RH is captured. PG react rapidly to RH without almost no delay. In hydration process, when the water is absorbing by PG, PG does not reach its maximum height abruptly. Whereas in dehydration process, PG expel water and restore to their original thickness within 2 s. Such difference may indicate that there are different diffusion mechanisms dominate the swelling/shrinkage process of PG, which may be related to PG's unique structure.

Figure 10D:
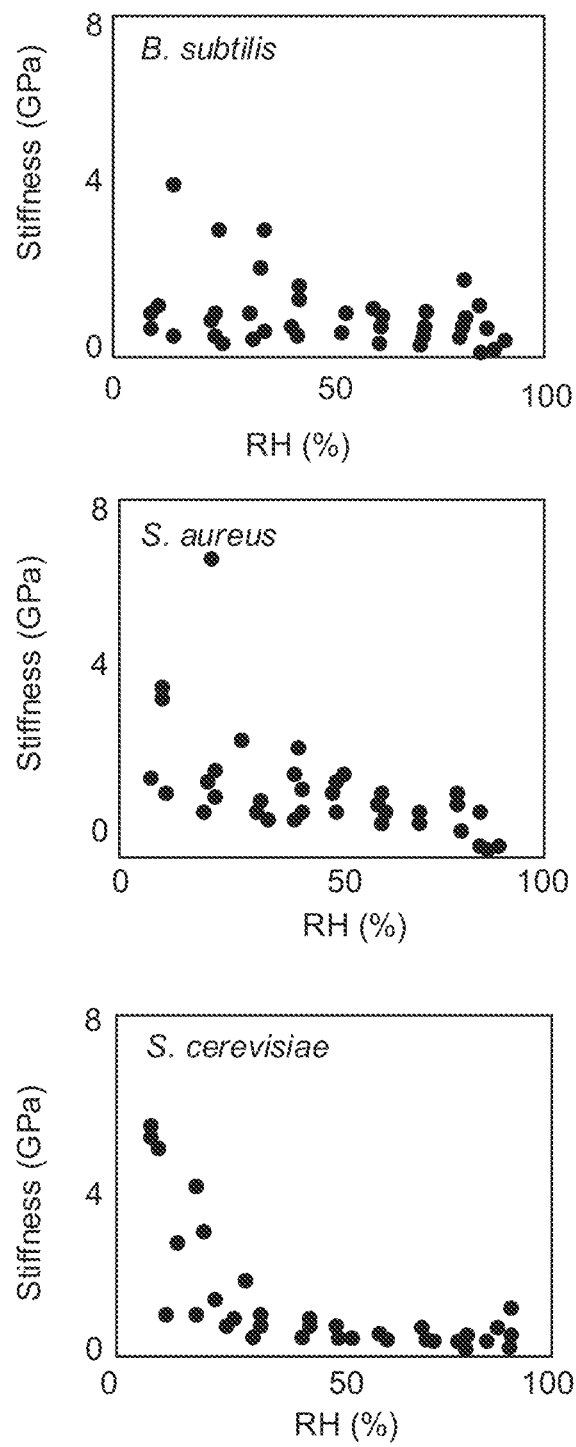
FIG. 10D is a scatter plot of stiffness of the three PGs as a function of RH.
Figure 11A:
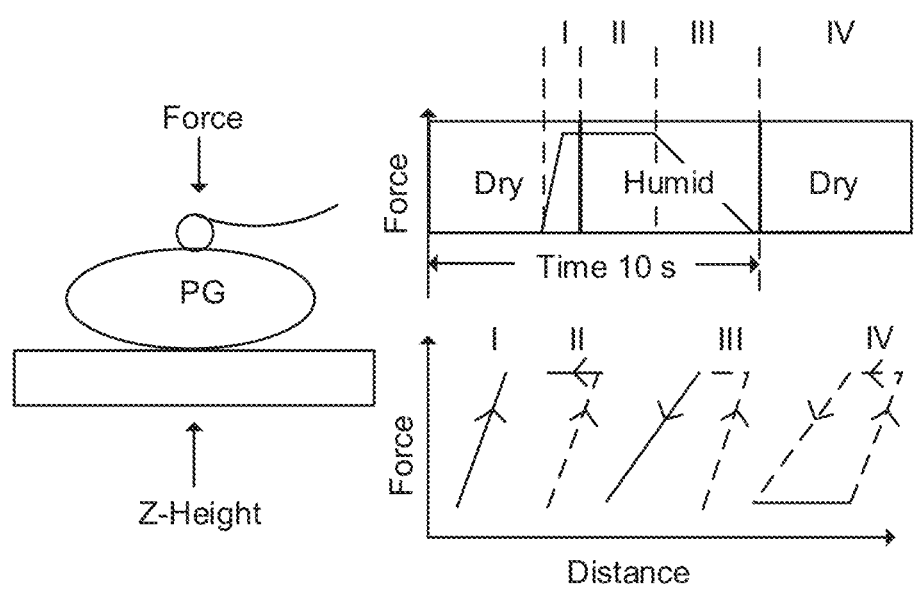
FIG. 11A is a schematic illustration of an AFM based thermodynamic cycle consist of applied force and varying RH to measure work done of PG during hydration-dehydration process.
Figure 11B:
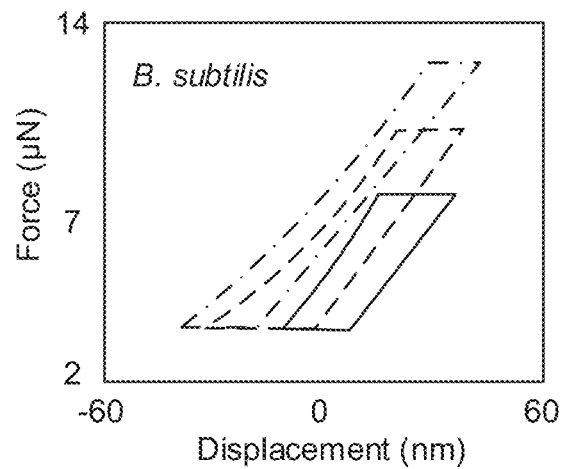
FIG. 11B, FIG. 11C and FIG. 11D are graphs of force vs. displacement (FD) curves of three PG at different maximum pressures.
Figure 11C:
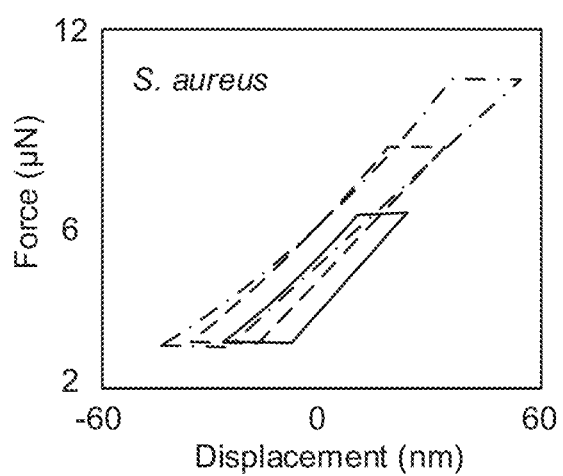
Figure 11D:
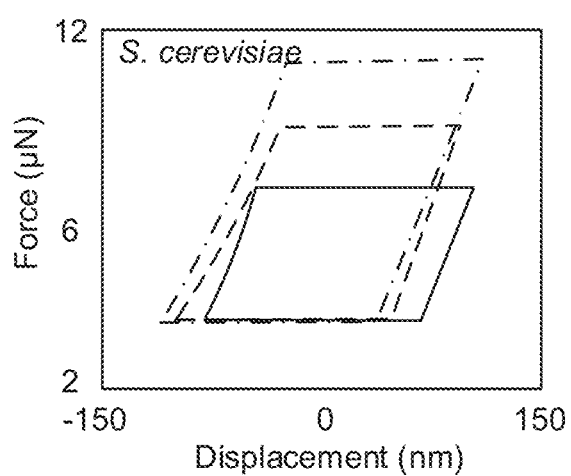

The stiffness of responsive material play an important role in application. AFM nanoindentation measurement is applied here to investigate Young's modulus of PG. To measure the Young's modulus, PG sample was indented by an AFM tip with 250 nm radius. During RH change steadily from 10% to 90%, typical force vs. distance (FD) curve of indentation at each 10% RH can be obtained by single ramp function of AFM contact mode. Young's modulus of PG was determined by fitting these 1) curve in Hertz model of contact mechanics. FIG. 11D shows the evolution of young's modulus as a function of alternating RH. Notably, PG from all three species has high Young's modulus at dry state (about 1 GPa to 5 GPa). Comparing with three PG from different bacterial species, PG from B. subtilis, which has highest responsive strain has smallest Young's modulus. PG from S. cerevisiae, which has lowest responsive strain has largest Young's modulus instead. When RH is increasing, stiffness of PG gradually decreases in a non-linear relationship. When RH is low, one assumes there is cavitation forming inside of the water that confined in the porous structure of PG. Such cavitation contains large negative pressure that support the structure of PG and provide significant stiffness. Whereas when RH is increasing, the cavitation will be replaced by water molecules and weaken the mechanical property of PG. FIG. 10D is a scatter plot of stiffness of the three PGs as a function of RH.

Figure 11E:
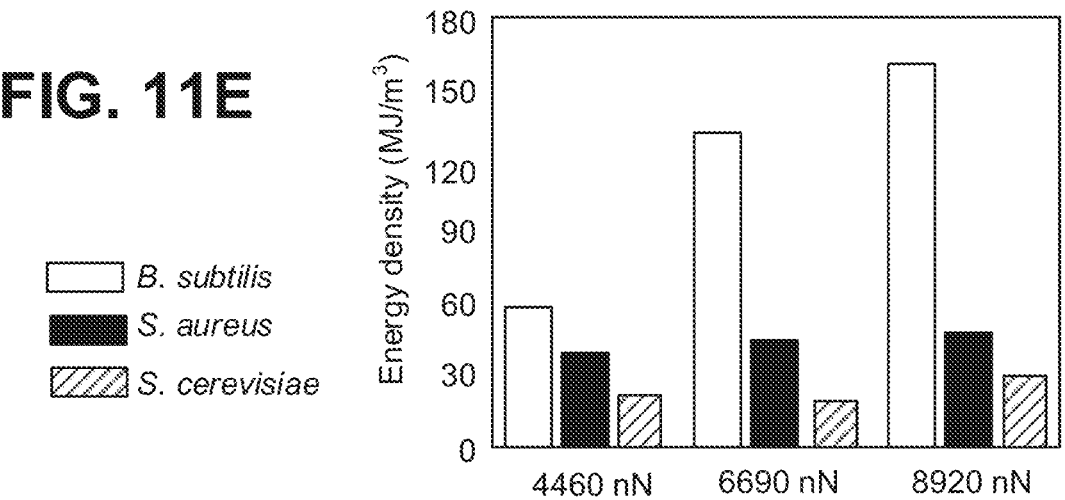
FIG. 11E is a graph of energy density of three PG at different maximum force.
Figure 11F:
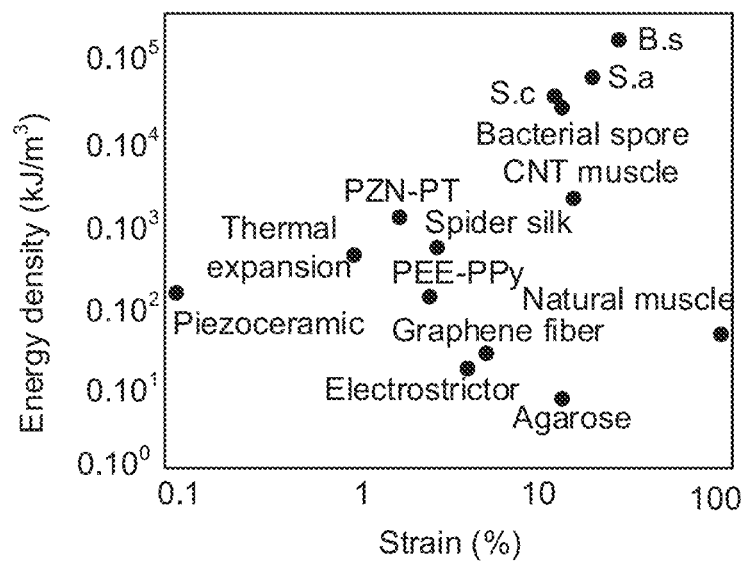
FIG. 11F is a graph depicting the energy density and responsive strain of PG compared with existing humidity responsive material and some well-established stimuli responsive actuator.

To quantify the energy contained by PG during a hydration-dehydration process, a thermodynamic cycle was introduced that included indenting force provided by AFM cantilever coupled with the above-mentioned dynamic humidity system. See FIG. 11A. The whole thermodynamic cycle has four stages. Before the cycle starts, the PG rests at low RH, while AFM tip maintains contacting with PG by applying a negligibly small force. In stage I, loading force provided by AFM cantilever begin to increase until reach predetermined value. In stage II, when the PG is subject to high RH, its thickness expands dramatically which is represented by deflection signal of AFM cantilever. In stage III, the loading force decrease back to zero. In stage IV, the cycle is completed by switching to low RH, when the PG will restore to its original thickness. Customized LABVIEW® program can continually run this cycle and monitor all loading force and displacement data. By aligning these data with time, force vs. displacement curve can be plotted. The area enclosed by such curve is the actual work done of PG correspond to the thermal dynamic cycle. Work done was measured of all three different PG (B. subtilis, S. aureus and S. cerevisiae) at different maximum loading force (FIG. 11B, FIG. 11C and FIG. 11D). However, rather than comparing energy work between all responsive materials, comparing energy density is a more valuable and reliable method. Energy density is evaluated by dividing the work done of one thermodynamic cycle to the volume contributed to this work. FIG. 11E reveals the energy density of three PG with three different maximum force. The energy density approximately increases with the maximum loading force, while PG from B. subtilis has higher (up to 161 $MJ/m^3$) energy density than S. aureus and S. cerevisiae (up to 50 $MJ/n^3$ and 30 $MJ/m^3$). The maximum value of PG's energy density is 10 tines higher than reported uppermost (Bacterial spore, 10 $MJ/m^3$). In FIG. 11F, the energy density and responsive strain of PG is compared with existing humidity responsive material and some well-established stimuli responsive actuator. Both energy density and humidity responsive strain of PG are the existing highest value, thus make PG potentially become a competitive building block in application of sensor, smart robot, artificial muscle and energy harvesting devices.

To further confirm the practical application potential of PG, PG was assembled with adhesive and scale up the humidity responsive phenomenon. Three bacterial PG, *B. subtilis, S. aureus* and *S. cerevisiae* were mixed with an adhesive, and then deposit 3 μm PG layer onto a 3 mm×5 mm×8 μm polyimide film. Once the solution was completely dried, the film was moved into a closed chamber with one side transparent wall. An inserted humidity sensor monitored the RH inside the chamber. The shape of the film correspond to varying RH can be captured by camera. The reversible bending of film is attributed to the expanding and contacting of PG when RH is changing. All captured pictures can be analyzed to extract the relationship between radius of curvature and RH, which can transfer into the relationship between responsive strain and RH. For elastically responsive material, the energy density can be approximately calculated by: $\rho=E(\delta)^2/2$, where E is young's modulus of the material and $\delta$ is the responsive strain.

The efficiency of energy transformation can be evaluated by the ratio between measured energy density and theoretical limit of chemical potential energy density. The work done per mole in evaporation process is given by the chemical potential difference in different humidity level:

$$W = RT \ln RH |_{RH_{dry}}^{RH_{wet}}$$

where R is the gas constant and T is room temperature. By applying this equation to the current situation, where RH is from 5% to 90% during hydration-dehydration process of PG, the overall work done by water evaporation is 400 MJ/m³, which is the theoretical limit of energy density in evaporation.

The mass change of PG from 10% to 90% RH was measured to evaluate water absorption amount, which can lead to the ratio of water that involve in this work. The mass change is simply obtained by a digital balance with closed chamber that can vary RH. FIG. 12A, FIG. 12B and FIG. 12C shows that different species of PG has similar amount of water absorption, which PG from *B. subtilis* has 20.2%, from *S. aureus* has 19.9% and from *S. cerevisiae* has 16.8%. The resulting theoretical energy density are 106.5 MJ/m³ (*B. subtilis*), 104.8 MJ/m³ (*S. aureus*) and 88.5 MJ/m³ (*S. cerevisiae*), where the corresponding efficiency of energy transformation are 84.5%, 74.3% and 67.8%.

At the same time, the volume change of PG via swelling is estimated by taking measured one-dimensional steady state strain to three-dimensions. Such estimation is valid because vertical and 2D surface expansion of PG is approximately same. By selecting the mass and volume data at same RH from 10% to 90%, the relationship of mass vs. volume was plotted when PG is swelling. Remarkably, when RH is varying from 10% to 90%, mass changes nonlinearly with volume.

Methods 1
Humidity System

The steadily alternative RH is achieved by combining one dry lab air with another water-saturated air stream that pass through a water bottle. Commercial humidity sensor was inserted into AFM micro-chamber to monitor real time RH. The LABVIEW® program (National Instrument) can read and display real time RH. The dynamic change of high and low RH is provided by inserting two small peptide tip that connected to dry air and humid air into AFM chamber. These two tips were concisely placed to insure their direction is well aligned with PG sample. A solenoid valve (SMC) was used to block one air and allow only another air flow once upon a time. By applying a square wave to the solenoid valve, the dry and humid air can switch on and off abruptly.

Characterization of PG

Topography of PG at different RH was conducted by commercial AFM (Multimode 8, Bruker) in tapping mode. AFM tip was applied for imaging. Varying RH was carried out by above mentioned steady humidity system. Images of same location at different RH were captured then opened by Nanoscope Analysis 1.9 (Bruker) to analyze their sectional topographies. Plane fit command was used to eliminate tilt effect of sample. Afterwards, section command was used to extract the sectional topography of PG. By recording the peak height of each image at same location and dividing to original height, the relationship of steady state strain of PG with RH can be constructed.

Morphologies of PG were evaluated by SEM.

Data Acquirement of Dynamic Height Change and FD Curve

Commercial AFM (Multimode 8, Bruker) and 250 nm with 200 N/m LRCH probe was utilized to measure the dynamic height change and energy density of PG. The PG sample was scanned in Tapping mode and continuously decrease scan size and change offset to make sure the AFM tip was located upon PG. After the scan sizes decrease to 0.1 nm, the AFM feedback signal was switched from tapping amplitude to deflection. To measure dynamic height change of PG, RH inside AFM chamber change abruptly by using above mentioned dynamic humidity system. By offsetting feedback set point, digital signal of piezo scanner were monitored by LABVIEW® program. Digital signal of piezo scanner transfer into height change of PG by multiplying calibrated Z-scanner sensitivity. To obtain the FD curve produced by thermodynamic cycle, a digital signal of the photodiode was collected, which can transfer to applied force by multiplying calibrated deflection sensitivity and spring constant of cantilever. Herein, DS was calibrated by ramping on hard surface; spring constant by indenting reference cantilever. Time-aligned applied force and deflection consist the FD curve that can be used in calculating the energy density of PG.

Measurement of Stiffness

The stiffness of PG was characterized by performing AFM indentation on PG. At every steady RH, by using single ramp, force vs. deflection curve can be obtained. By using Nanoscope Analysis 1.8 (Bruker), the change force vs. deflection curve is changed into force vs. separation curve, where separation means indentation depth in this situation. According to the Hertz model of contact mechanics, Young's modulus of material can be calculated from the slope of force vs. indentation curve according to the formula:

$$E = \frac{3}{4}FR^{-1/2}d^{-3/2} \quad (1)$$

where F is applied force, d is indentation depth and R is the AFM tip radius. Force and indention depth data at both end of the total indentation region can easily acquire from curves. The slope of curves and young's modulus were simply calculated using a spreadsheet program.

Preparation and Characterization of Bending Actuator

The polyimide films with 13 μm thickness (McMaster-Curr) that used for bending actuator were cut into 3 mm×6 mm pieces. The concentration of PG sample were prepared by achieving 3 μm thickness onto 3 mm×6 mm polyimide film. Meanwhile, solution of adhesive were also prepared to maintain 1 μm thickness on film. These two solutions were mixed and kept them in fridge overnight. Afterwards, sample solution (PG and adhesive) was deposited on polyimide film. Once the films were completely dry, they were moved into a closed chamber with one transparent wall. The air tube and humidity sensor that control and monitor RH have embedded into chamber before closing. Modulating RH inside of chamber from 10% to 90%, the responsiveness of films was recorded by a digital camera (Canon EOS Rebel SL1) Image J (NIH image) was used to analyze the curvature of film from recorded pictures by following steps: First, the ruler scale in the unit of pixel was measured. Then, three points were chosen at the curved edge and fit a circle with them. By measuring the diameter of fitting circle and transfer the unit from pixel to millimeter, curvature data of film at each RH was obtained.

Figure 13:
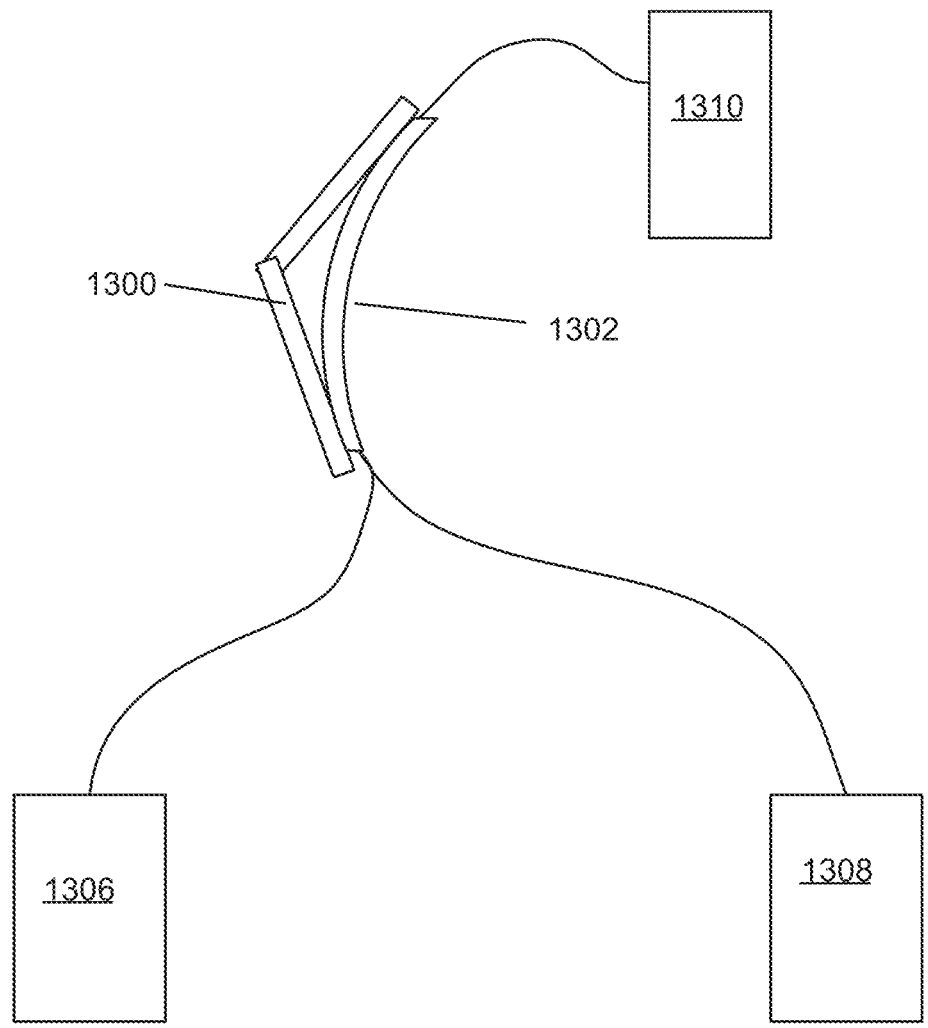
FIG. 13 depicts a robotic appendage being actuated by a water-responsive material.

Referring to FIG. 13, in one embodiment, a robot with a moveable appendage 1300 is provided. An artificial muscle 1302 is attached to the moveable appendage that actuates the appendage 1300. The artificial muscle 1302 comprise a flexible hollow tube. The hollow tube is flexible such that it has a Young's modulus between 10 kPa and 100 GPa. At least a portion of the internal surface of the artificial muscle 1302 is coated with a water-responsive material, such as PG. A source of moist fluid 1306 is fluidly connected to the flexible hollow tube. In one embodiment, the moist fluid 1306 is air with a high humidity. In another embodiment, the moist fluid 1306 is liquid water. The moist fluid 1306 can be selectively pumped into the flexible hollow tube and hydrate the PG. A source of dry fluid 1308 is also fluidly connected to the flexible hollow tube. The dry fluid 1308 can be selectively pumped into the flexible hollow tube and hydrate the PG. In one embodiment, the dry fluid 1308 is a low humidity gas. The content of the flexible hollow tube can be removed and collected in reservoir 1310. For example, moist fluid 1306 that is present in the hollow tube can be pushed out of the tube and into the reservoir by pumping dry fluid 1308 into the tube. This lowers the humidity within the tube. Alternatively, dry fluid in the tube can be pushed into the reservoir 1310 by pumping moist fluid 1306 into the tube. In this manner, the RH within the tube can be controlled which, in turn, controls expansion of the water-responsive material.

By coating a portion of the internal surface of the tube with the water-responsive material, expansion of the water-responsive material can bend the tube and actuate the appendage 1300. In one embodiment, between 10% and 90% of the internal surface of the area of the tube is coated with the water-responsive material and the remainder is uncoated. In this fashion, the artificial muscle can provide rotational movement, translational movement, expansion, contraction or a combination thereof. The PG in the aforementioned embodiment can be mixed with a secondary component, such as an epoxy, a cellulose or a collagen.

In one embodiment *Bacillus subtilis*' peptidoglycan is used. This peptidoglycan exhibits extremely powerful water-responsiveness with actuation energy and power densities reaching 72.6 MJ m$^{-3}$ and 9.1 MW m$^{-3}$, respectively. This is orders of magnitude higher than those of frequently used actuators. When responding to humidity changes, peptidoglycan reversibly deforms as much as 27.2% within 120 ms. Surprisingly, peptidoglycan exhibits an energy conversion efficiency of ~66.8%, and its actuation pressure reaches ~354.6 MPa, which doubles the pressure of state-of-the-art hydraulic actuators. In one embodiment, peptidoglycan soft muscles drive self-adapting and gripper systems, illustrating possibilities of using peptidoglycan as building blocks for high-efficiency actuators that could remove design constraints for many robotic systems. Peptidoglycan's extreme water-responsiveness could be attributed to the highly viscous flow that efficiently deforms peptidoglycan's pore surfaces during dehydration and a stiff and deformable supramolecular structure that allows the deformation energy to be stored and released elastically. This disclosure reveals a general design criterion for bio-mimic approaches to directly harness the ubiquitous hygroscopic energy for broad engineering applications.

Figure 14A:
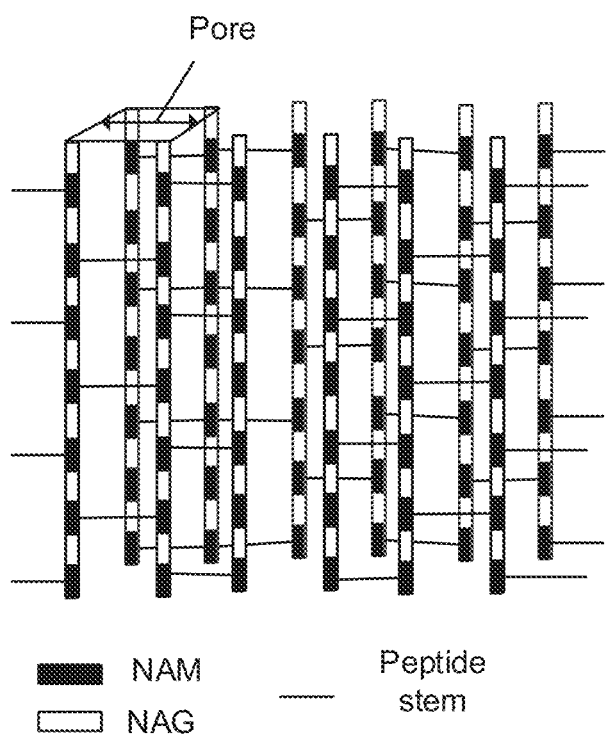
FIG. 14A depicts *B. subtilis* PG which consists of glycan backbones cross-linked by amphiphilic peptide stems that forms a three-dimensional mesh-like structure.
Figure 14B:
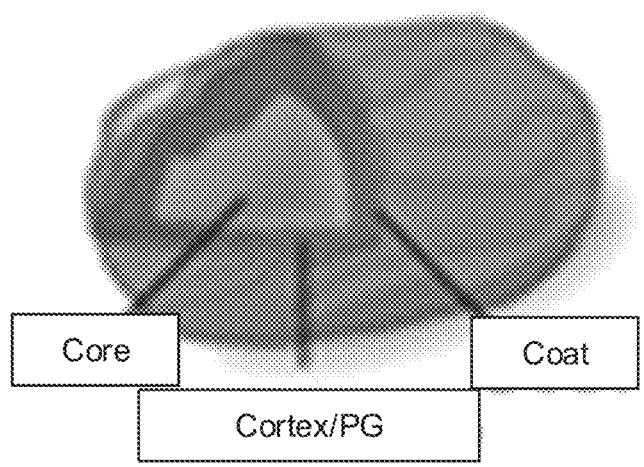
FIG. 14B depicts a *B. subtilis* spore that is mainly composed of a core with genetic information and two concentric shells, including a cortex layer of loosely cross-linked PG (spore PG), and a coat layer for chemical resistance.
Figure 14C:
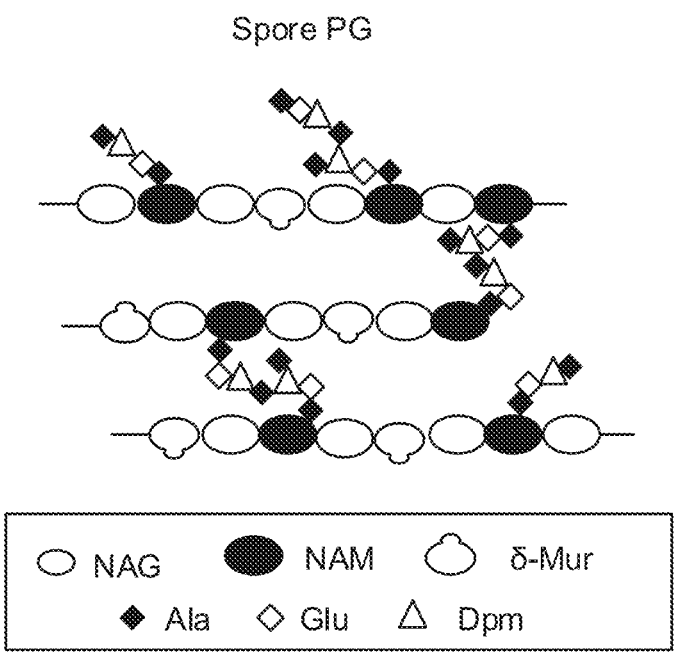
FIG. 14C illustrates that spore PG contains NAG, NAM, and δ-Mur glycan chains that are loosely cross-linked by peptide stems of Ala- Glu-Dpm-Ala (c)
Figure 14D:
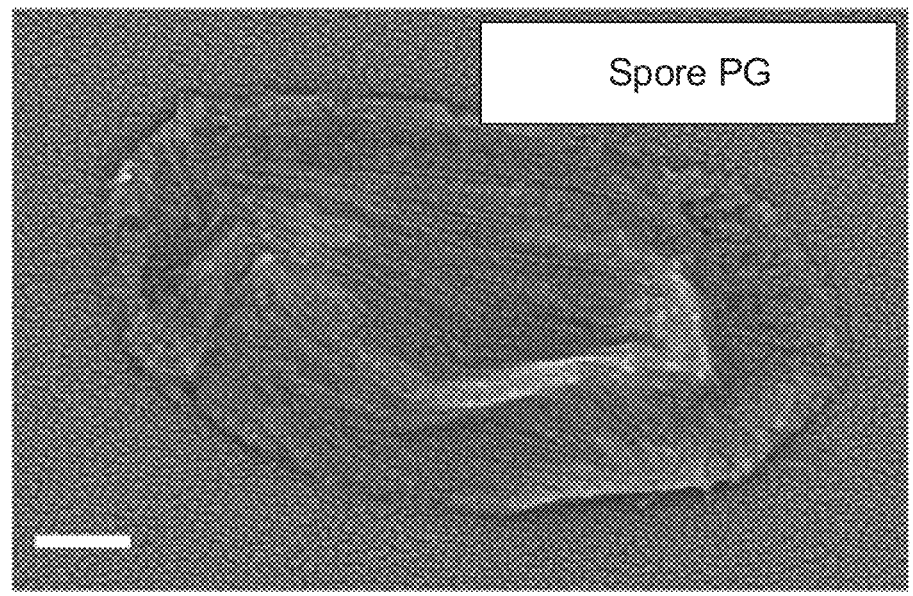
FIG. 14D is a SEM image of spore PG.
Figure 14E:
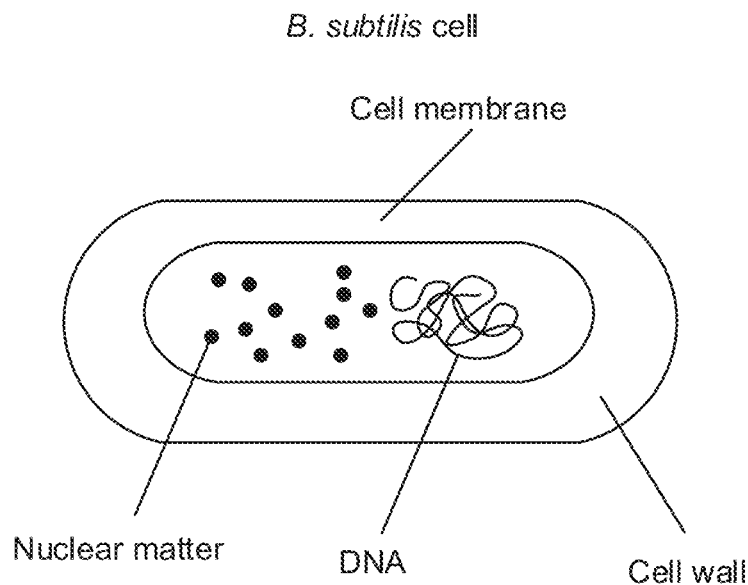
FIG. 14E and FIG. 14F show cell wall PG has a similar chemical structure to that of spore PG, but has gly can chains only consist of NAG and NAM that are highly cross-linked by similar peptide stems.
Figure 14F:
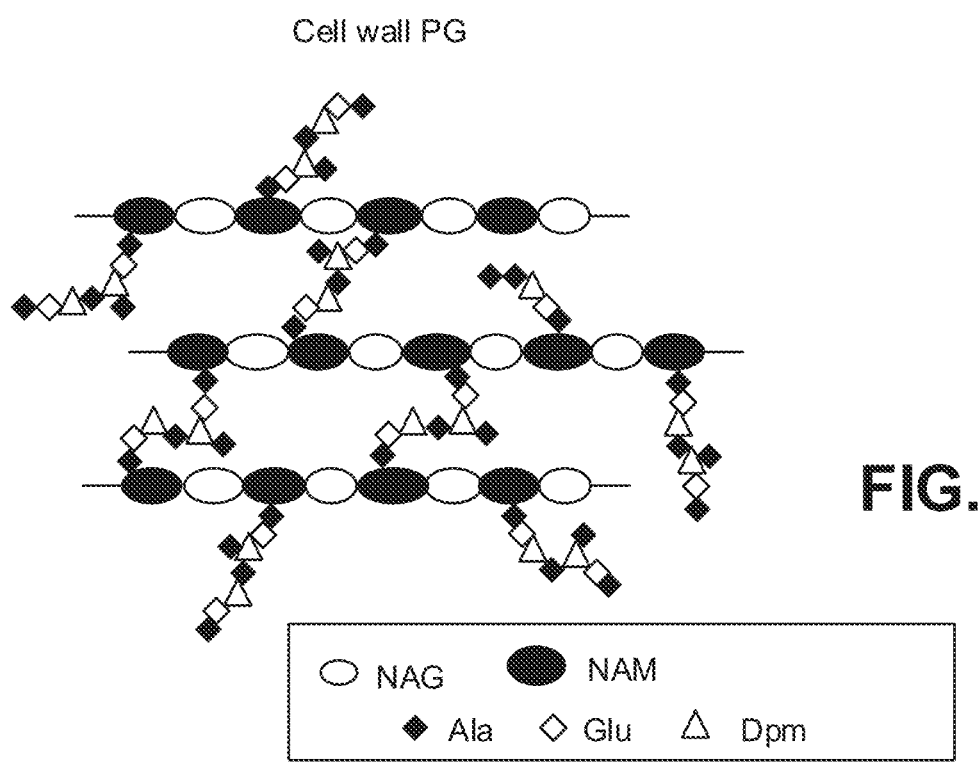
Figure 14G:
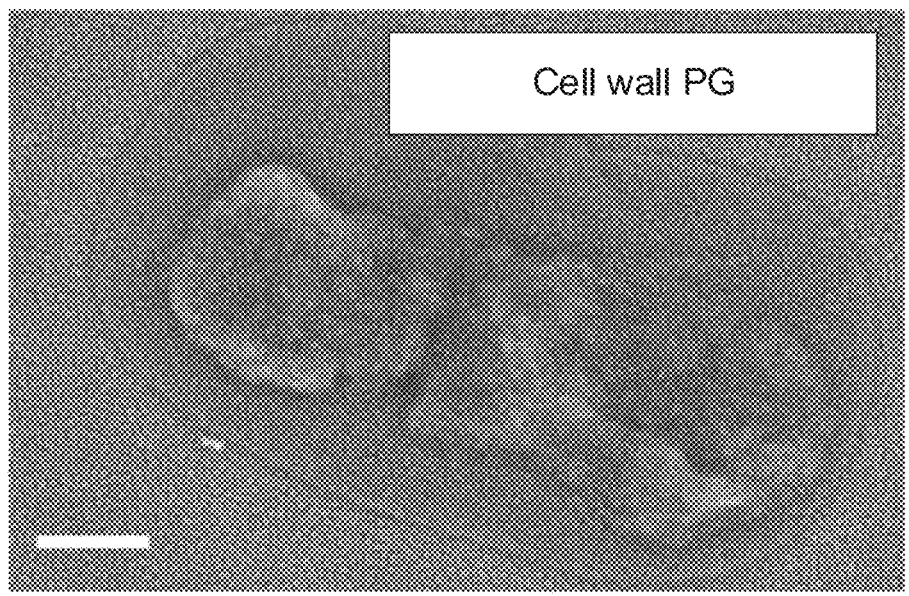
FIG. 14G is a SEM image of cell wall PG, scale bar 200 nm.
Figure 14H:
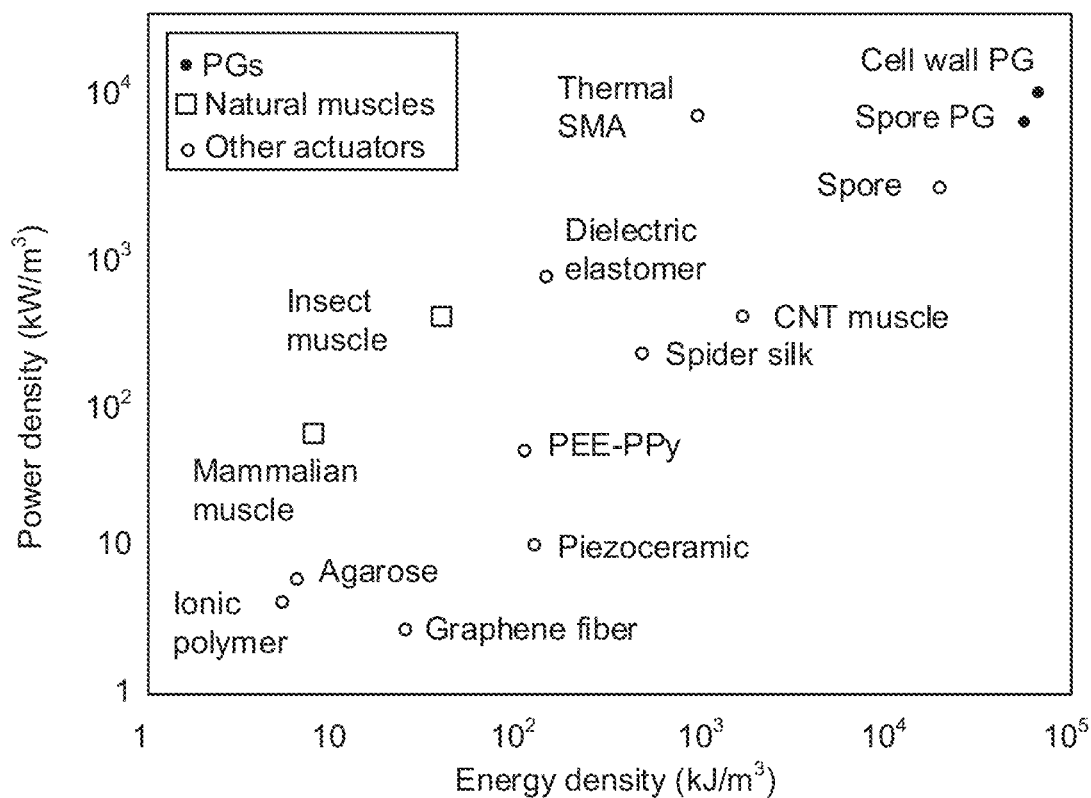
FIG. 14I is a graph showing PG's energy and power densities are higher than those of known muscles and stimuli-responsive materials.

This disclosure illustrates that *Bacillus (B.) subtilis* spore's and its bacterial peptidoglycan (PG), which possesses a rigid hierarchical structure that consists of glycan backbones cross-linked by amphiphilic peptide stems (FIG. 14A), exhibit unprecedented high water-responsive (WR) energy/power densities and efficiencies (FIG. 14H). When local RH is alternated between 5% and 90%, PG isolated from *B. subtilis* spores (spore PG) (FIG. 14B, FIG. 14C and FIG. 14D) reversibly expands and contracts by as much as 50.1% of its original height with a relatively fast speed (~0.14 s for expansion and ~0.24 s for contraction). It exhibits extremely high WR energy density, reaching 59.9 MJ m$^{-3}$ (46.1 k/kg) that is about three times higher than spores' energy density 1, and its power density reaches 7.1 MW n$^{-3}$ (5.5 kW/kg). *B. subtilis* bacterial cell wall PG that shares a similar molecular structure to that of spore PG (FIG. 14E, FIG. 14F, and FIG. 14G) exhibits high WR performance. Similar to spore PG, cell wall PG also rapidly responds to RH changes, but with a faster contraction speed (0.12 s) and a slower expansion speed (0.4 s) compared to spore PG. Such difference correlates to cell wall PG's more hydrophobic nature resulting from a higher density of peptide stems. Surprisingly, cell wall PG's actuation energy and power densities reach 72.6 MJ m$^{-3}$ (55.8 kJ kg$^{-1}$) and 9.1 MW M$^{-3}$ (7.0 kW kg$^{-1}$), respectively. These numbers show that PG's WR actuation is more energetic and powerful than those of existing actuators/muscles, including spores' record-high values (FIG. 14H). Considering cell wall PG's 21 wt % of water exchange during its WR actuation, it was estimated to be 66.8% efficient, surpassing those of all known natural muscles. A series of soft PG muscles was also developed by depositing a thin layer of PG/adhesive composites onto polymer substrates to form bilayer structures that reversibly bends and straightens in response to RH changes. Using these soft PG muscles, origami structures are demonstrated in this disclosure that self-adapt to environmental RH changes, as well as a soft gripper that can perform programmed grasp, carry, and release tasks under ambient conditions.

Distribution and Water Uptake of PG in *B. subtilis* Spores

Figure 15A:
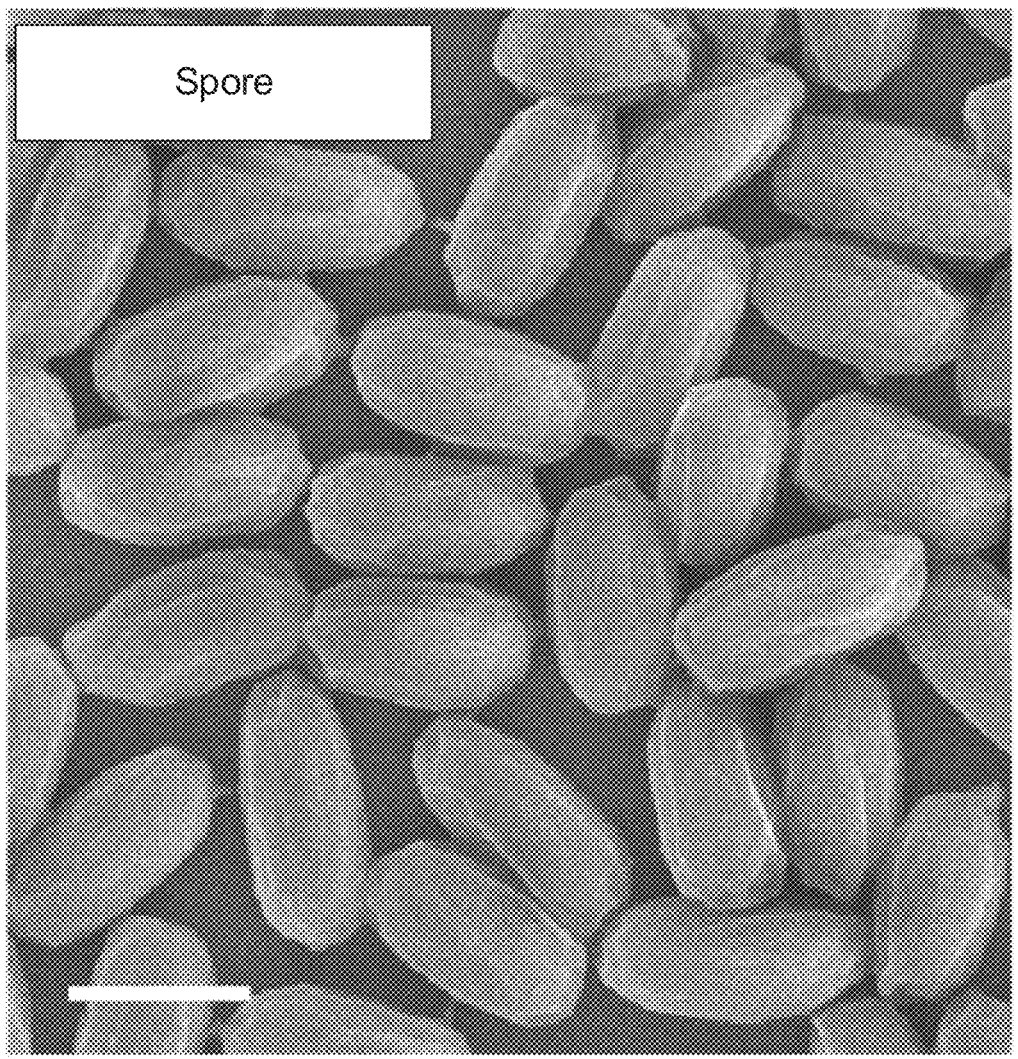
FIG. 15A is a SEM image of individual spores. Scale bar, 1 μm.
Figure 15E:
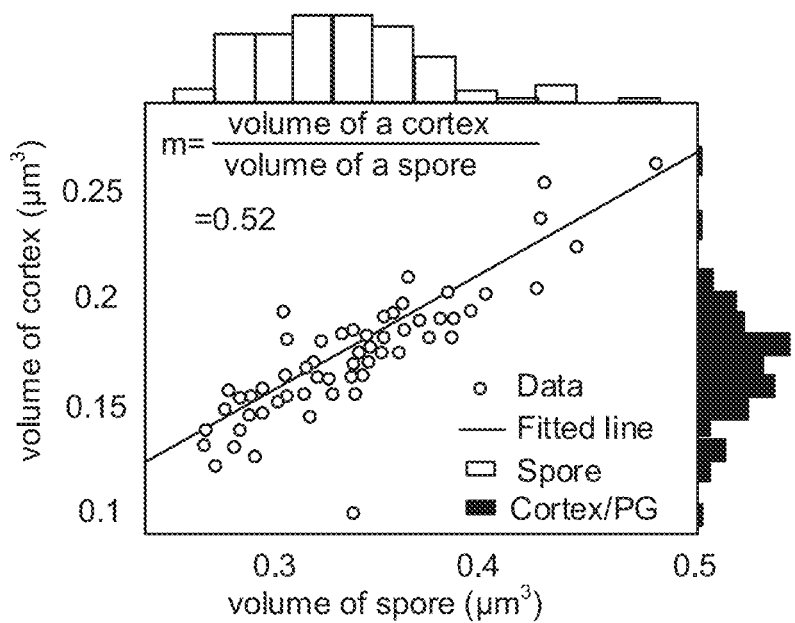
FIG. 15E shows a scattered plot of volumes of spores and their PG layer shows that PG takes up 52.4% of a spore's volume. Volumetric histograms of spores and their PG on the top and side, respectively.
Figure 15F:
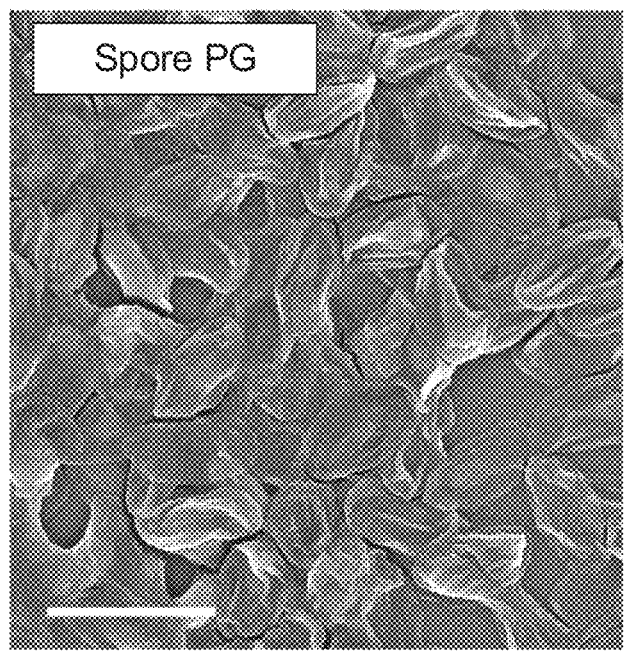
FIG. 15F is a SEM image of isolated spore PG. Scale bar, 2 μm.
Figure 15G:
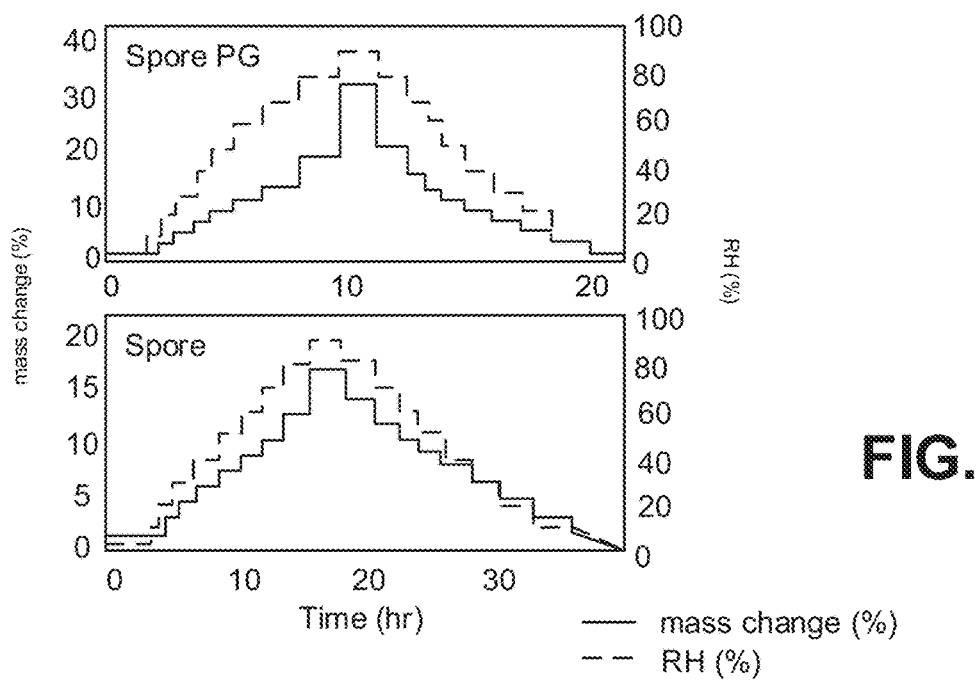
FIG. 15G depicts the results of a DVS measuring the mass change of spores and PG at various RHs during hydration and dehydration processes, giving their water sorption isotherms.
Figure 15H:
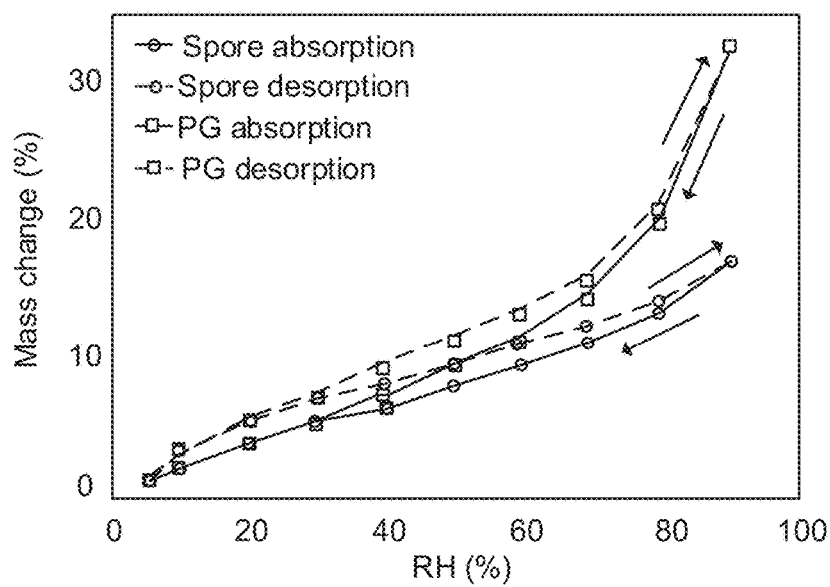
FIG. 15H and FIG. 15I depict water sorption of PG and non-PG components are weighted by their mass ratios in a spore. The results indicate that PG dominates spore's water uptake between 40% RH and 90% RH. The largest standard error is less than 0.64% calculated from three measurements.
Figure 15I:
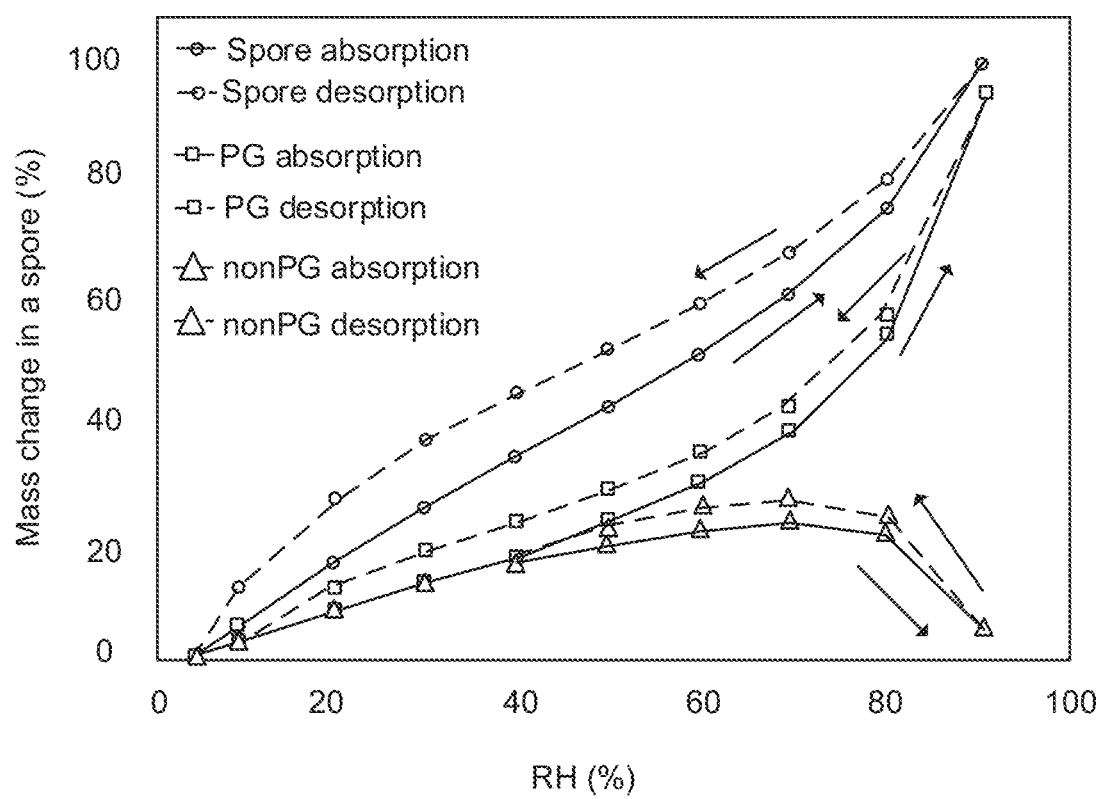

Without wishing to be bound to any particular theory, *B. subtilis* spores' substantial water-responsiveness could originate from its supramolecular component—PG, evidenced by PG's high water content. In general, *B. subtilis* spores have multiple concentric shells, including a core that contains the genetic information, a cortex layer of loosely cross-linked PG (spore PG), and a coat layer that is important for spores' chemical resistance (FIG. 14B). Spore PG, which is composed of N-acetylglucosamine (NAG), N-acetylmuramic acid (NAM), and Muramic-δ-lactam (δ-Mur) glycan chains that are cross-linked by peptide stems of alanine (Ala)-glutamic acid (Glu)-meso-diaminopimelic acid (Dpm)-alanine (Ala), exhibits a hierarchical and three-dimensional mesh-like structure with nanoscale pores (~6.8-38.4 nm in diameter) (FIG. 14B, FIG. 14C and FIG. 14I)). To investigate the role of PG in spores' water-responsiveness, PG's spatial distributions within spores was analyzed by taking serial cross-section SEM images of spores, and then reconstructed these cross-section images into a three-dimensional map (FIG. 15A, FIG. 15B, FIG. 15C and FIG. 15D, Methods). Despite the non-uniform thickness of PG (~122.4 nm) (FIG. 15C and FIG. 15D), PG occupies ~52.4% of the spore's volume, which is highly consistent in spores with various sizes (FIG. 15E). By using several protein denaturing agents (see Methods), non-PG components in spores were carefully removed and isolated PG whose geometry and chemistry were subsequently examined by a SEM and a liquid chromatography-electrospray ionization-mass spectrometry (LC-ESI-MS), respectively (FIG. 15F Methods). To understand the role of PG in spores' water exchange, a dynamic vapor sorption (DVS) system was used to measure water sorption isotherms of both spores and isolated PG over an RH range from 5% to 90% (FIG. 15G and Methods). During hydration and dehydration cycles, spores and the isolated PG can reversibly absorb and desorb 16.8 wt % and 33.0 wt % of water, respectively (FIG. 15H). To correlate PG's water uptake to that of spores, PG's water uptake was weighed by considering PG's volume ratio in a spore, and found that PG's water sorption approximately contributes 50% of that of a spore from 5% RH to 40% RH, and that PG starts to dominate spore's water sorption when RH is higher than 40% (contributing ~94% at 90% RH) (FIG. 15I). When RH is increased from 70% to 90%, spores' non-PG components show an unexpected water releasing phenomenon (FIG. 15I), which could be attributed to the increased internal pressure in spores due to PG's WR expansion.

WR Characterization of Spore PG

Figure 16A:
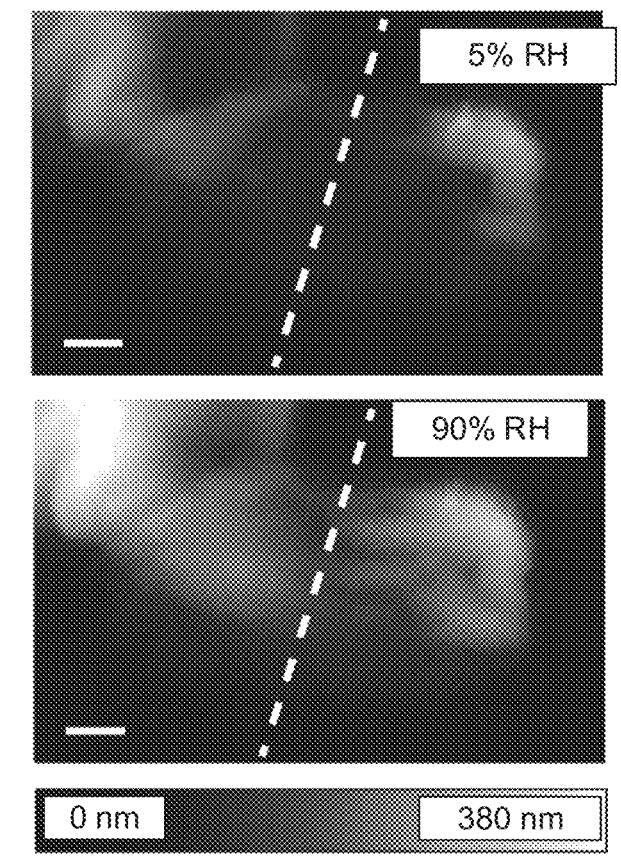
FIG. 16A depicts AFM topography images show that spore PG expands when local RH increases from 5% to 90%. Scale bar, 200 nm.
Figure 16B:
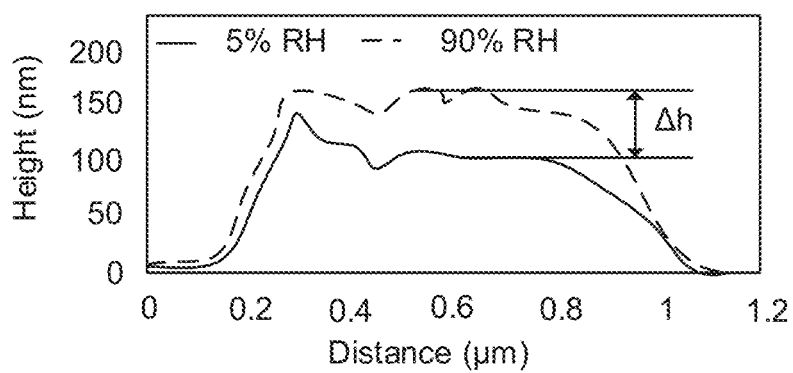
FIG. 16B is a graph showing Cross-sectional height profiles of spore PG at 5% RH and 90% RH.
Figure 16C:
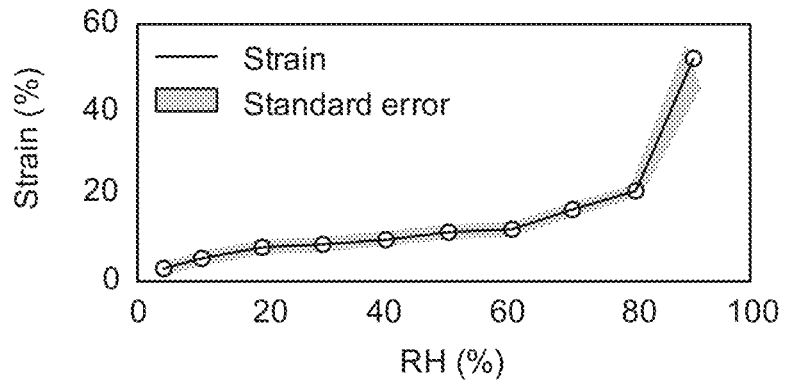
FIG. 16C is a graph showing spore PG' WR strain over RH levels.
Figure 16D:
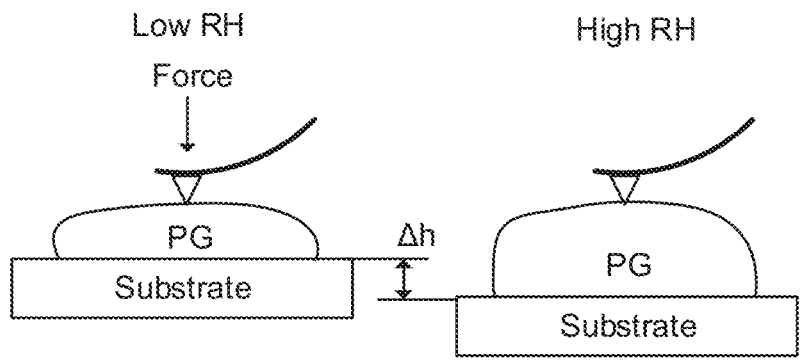
FIG. 16D shows spore PG have a fast WR speed when responding to alternating RH changes between 5% and 90%.
Figure 16E:
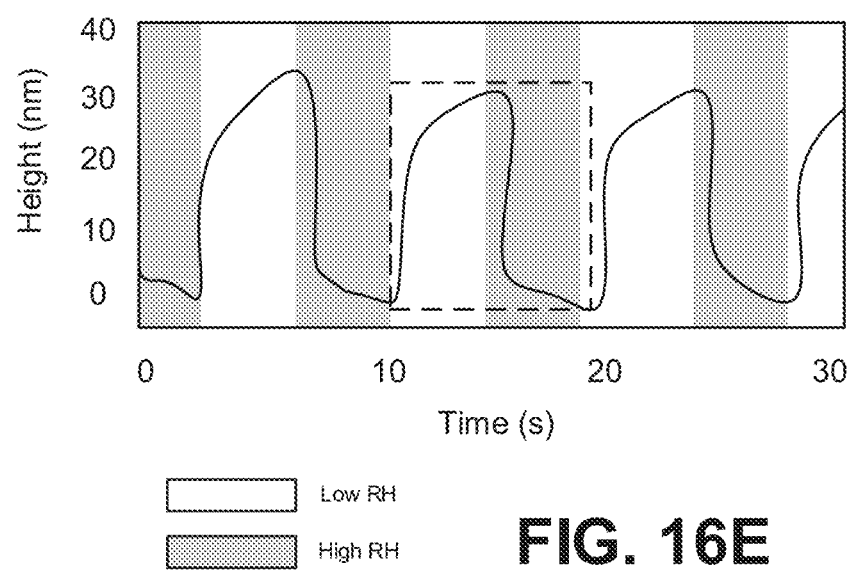
FIG. 16E is a graph showing height as a function of time in low RH and high RH conditions.
Figure 16F:
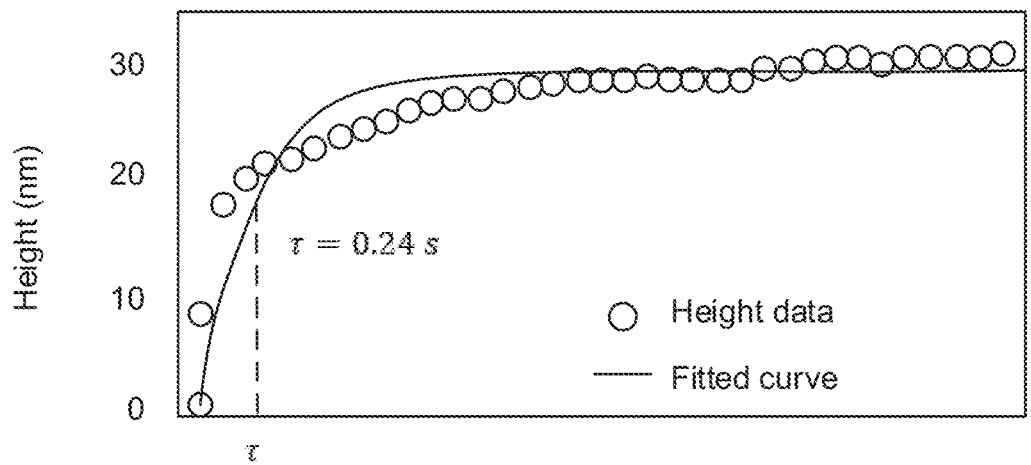
FIG. 16F and FIG. 16G depict relaxation time constraints. The relaxation time constants for spore PG's WR contraction and expansion are 0.24 s and 0.14 s, respectively.
Figure 16G:
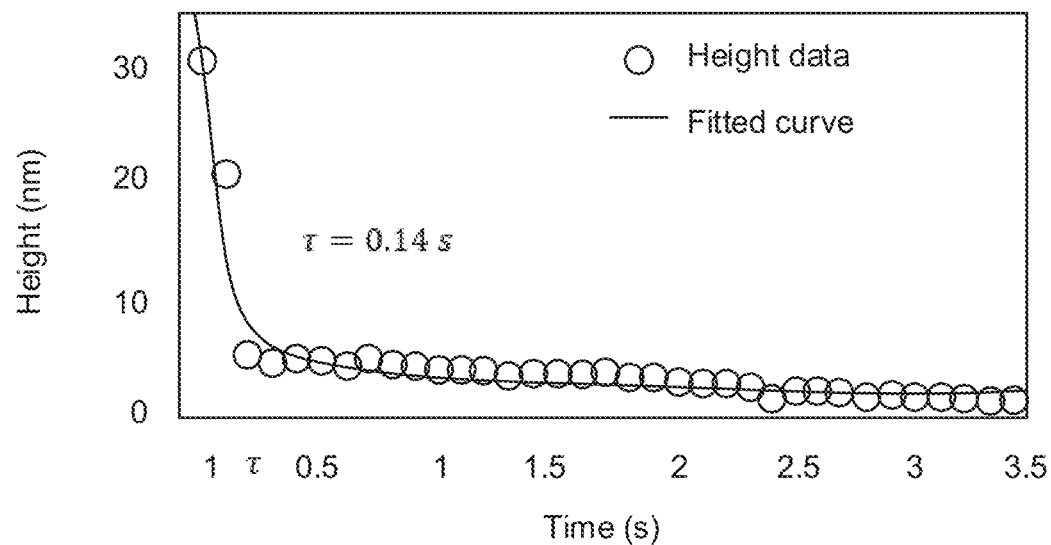
Figure 16H:
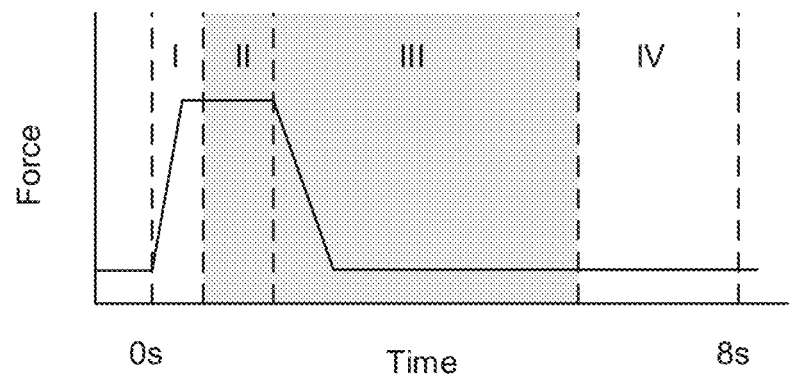
FIG. 16H and FIG. 16I depict a thermodynamic cycle, consisting of four stages with varying applied forces and RHs, is created by an environmental-controlled AFM, and is used to probe spore PG's work and power output during hydration/dehydration processes.
Figure 16I:
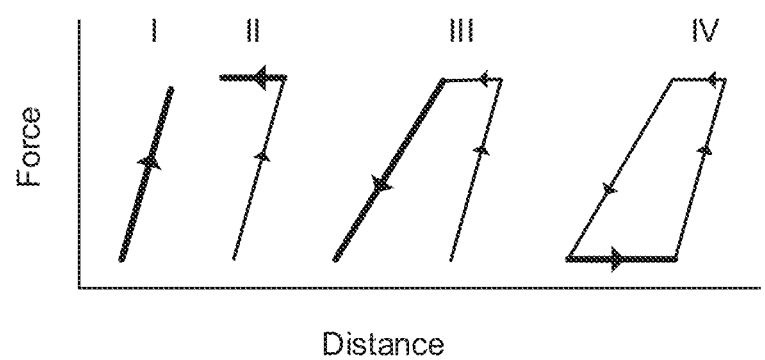
Figure 16J:
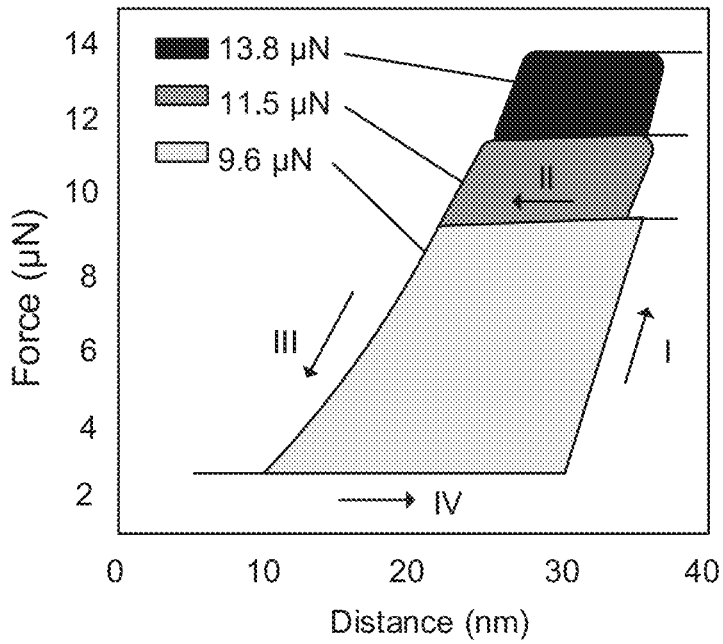
FIG. 16J shows Force vs. distance curves of spore PG during the thermodynamic cycles with various applied forces.
Figure 16K:
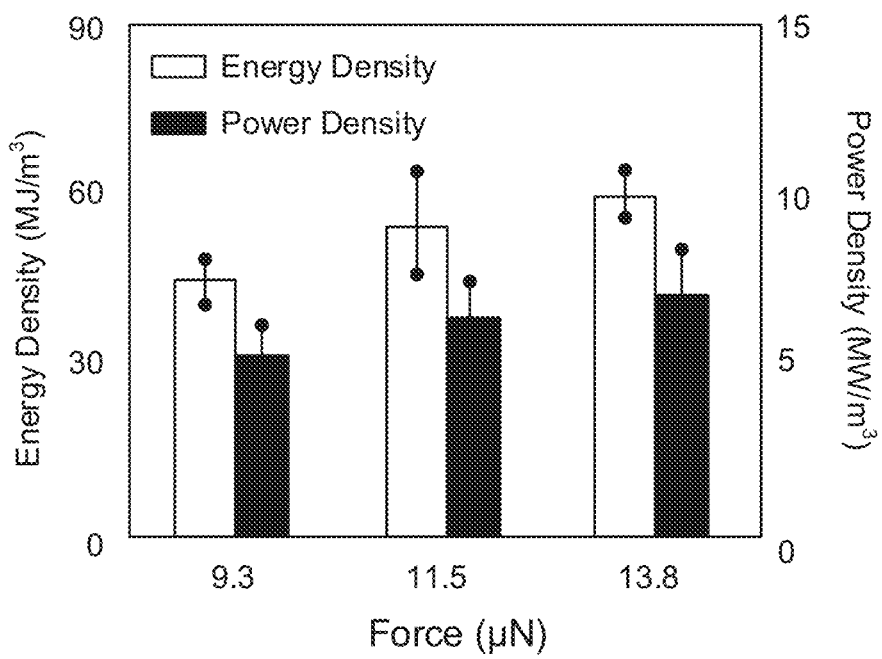
FIG. 16K is a graph of measured energy and power densities of spore PG with different applied forces and cycle times (8-12 s). Error bars represent standard errors calculated from five measurements.
Figure 16L:
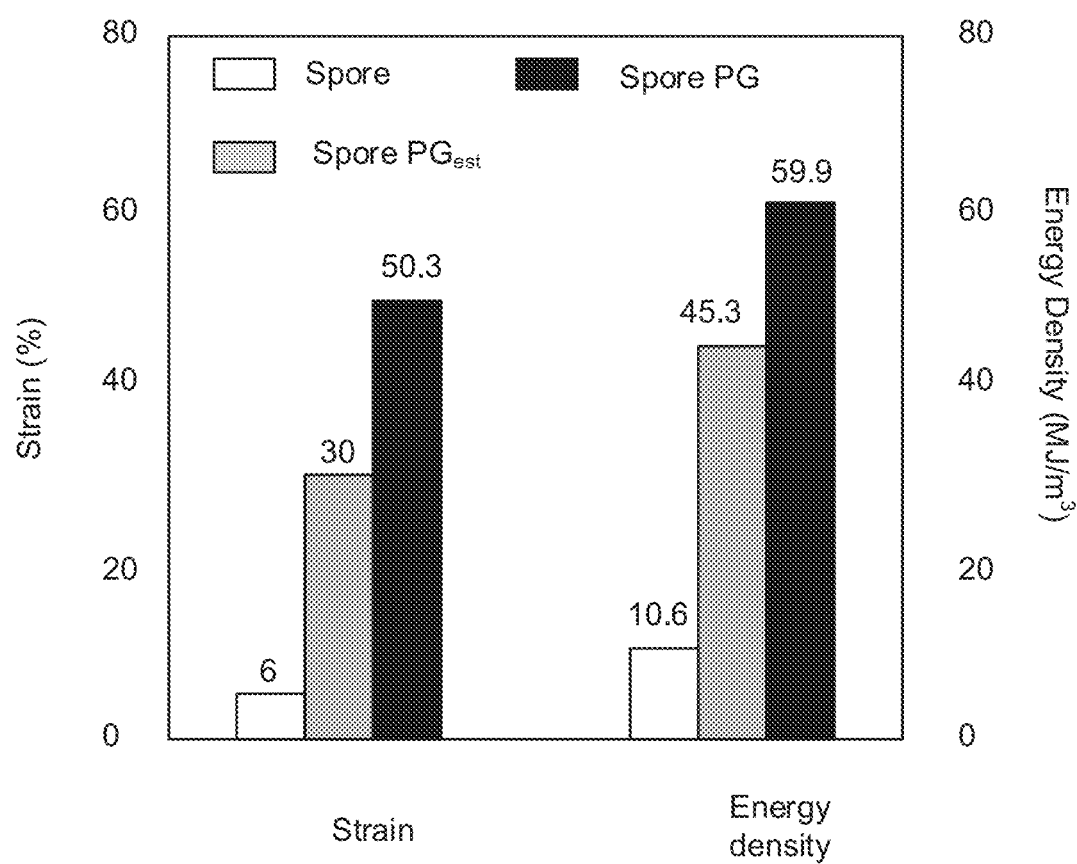
FIG. 16L is a graph of strain and energy density of spore PG by assuming that non-PG components show negligible water-responsiveness. Spore $PG_{est}$ represents the estimated data.

To directly probe spore PG's water-responsiveness, an atomic force microscope (AFM) was customized such that the local RH can be controlled while PG's WR deformation and actuation force were simultaneously monitored (see Methods). By using this environmental-controlled AFM, PG would dramatically and reversibly expand and shrink in response to RH changes (FIG. 16A and FIG. 16B). When RH gradually increases from 5% to 90% (PG reaches its equilibrium states at each RH), spore PG can expand as much as 50.1% of its initial height, showing a WR strain about 5 times larger than that of a spore and 2.5 times larger than that of the mammalian muscle (FIG. 16C). Note that PG's height increases approximately linearly with increasing RH up to 80%, and changes abruptly between 80% and 90% RH (FIG. 16C), which coincides with the trend of PG's water sorption isotherms characterized by DVS (FIG. 15H). Spore PG's WR actuation is extremely fast (FIG. 16D, FIG. 16E, FIG. 16F and FIG. 16G and Methods); for instance, it takes ~0.24 s (the relaxation time constant) for PG to desorb water and contract (FIG. 16F) and ~0.14 s to absorb water and expand (FIG. 16G). Spore PG's large WR strain and fast response speed, together with its high and humidity-dependent stiffness (Young's moduli are 4.91 GPa at 5% RH and 1.77 GPa at 90% RH, Methods), suggest high energy and power actuation during its hydration and dehydration processes. To quantify that, the environmental-controlled AFM was programmed and a thermodynamic cycle was created that is similar to what was previously used to estimate spore's energy density (FIG. 16H, FIG. 16I, FIG. 16J and Methods, Nature Nanotechnology, Vol. 9, February 2014, pp 137-141). The cycle consists of four stages: (I) a predetermined force is applied on the top surface of spore PG through a spherical AFM tip at ~5% RH; (II) the local RH rapidly increases to ~90%, and spore PG expands while the AFM tip maintains its force; (III) the applied force is released, allowing PG to fully expand at the high RH condition; (IV) the cycle is finished by decreasing RH back to 5% to allow PG to shrink to its original shape (FIG. 16H and FIG. 16I). During the thermodynamic cycle, the displacement of spore PG and the applied force are simultaneously monitored, and the enclosed area of the force-displacement curve shows the work done by spore PG (FIG. 16I and FIG. 16J). To maximize spore PG's energy and power output, the magnitude of the force applied on PG and the duration for each stage (FIG. 16J and Methods) was adjusted. FIG. 16J shows that the measured work increases with larger forces. To obtain spore PG's WR energy densities, PG's effective volume was estimated which contributes to the measured work. With an external force of 13.8 µN (an average pressure of 354.6 MPa), spore PG exhibits the maximum energy density of 59.9 MJ m$^{-3}$ (FIG. 16K), which is about six times higher than that of its spore (10.6 MJ m$^{-3}$)[16]. Considering the time (8-12 s) took to finish the whole thermodynamic cycle, spore PG's power density was estimated to be 7.1 MW m$^{-3}$, comparable to that of state-of-the-art shape memory alloy (FIG. 1H). Spore PG's high energy density, together with its high WR strain and water uptake, suggests that PG dominates its spore's water-responsiveness. Based on spores' WR behaviors and PG's spatial distribution in spores, spore PG's WR strain and energy density was estimated, assuming that only PG contributes to spores' water-responsiveness. Interestingly, PG's estimated WR properties are smaller than the measured ones (FIG. 16I), suggesting that non-PG components in spores dissipate energy during hydration/dehydration processes.

WR Characterization of Bacterial Cell Wall PG

Figure 17A:
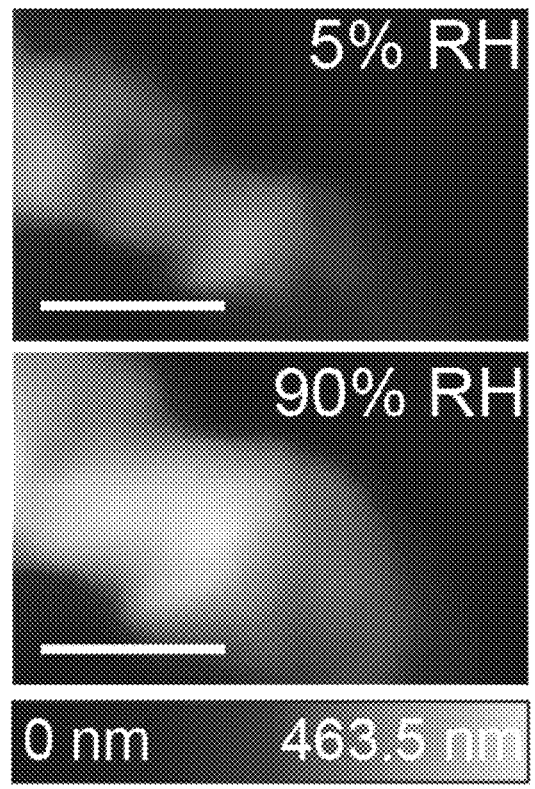
FIG. 17A depicts AFM topography images showing that cell wall PG expands when the RH is increased from 5% to 90%. Scale bar, 500 nm.
Figure 17B:
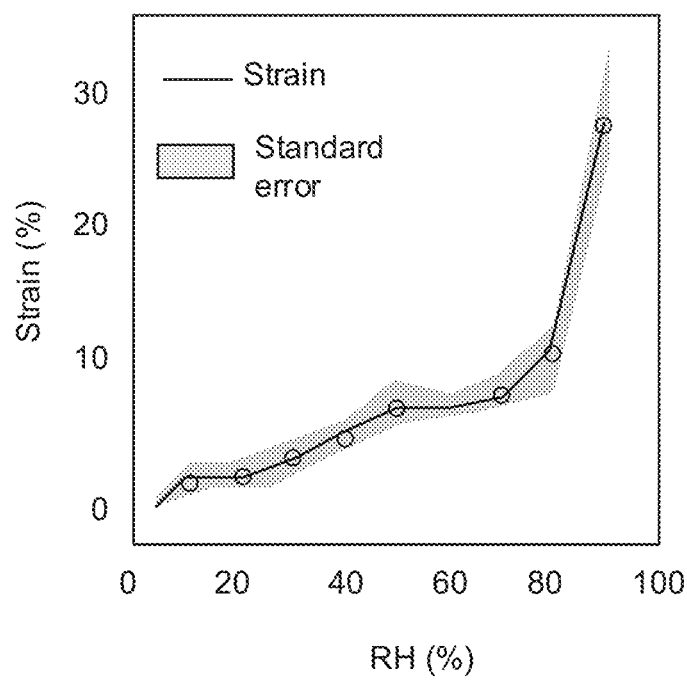
FIG. 17B depicts a graph of cell wall PG's WR strain over various RH levels.
Figure 17C:
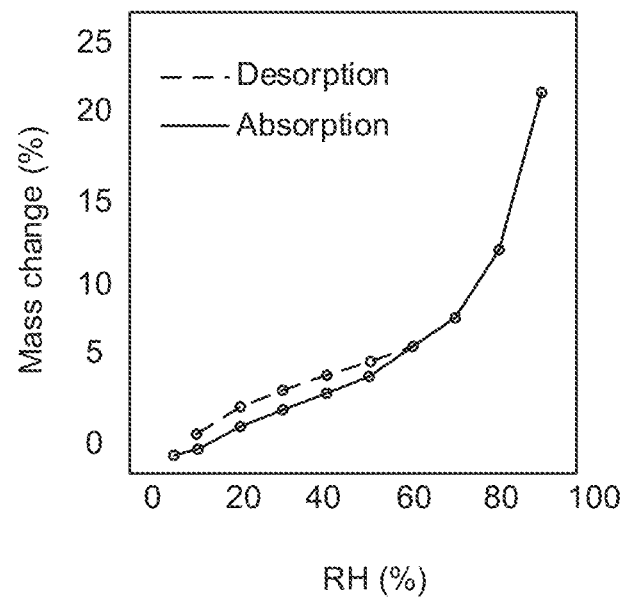
FIG. 17C is a graph of water sorption isotherms of cell wall PG.
Figure 17D:
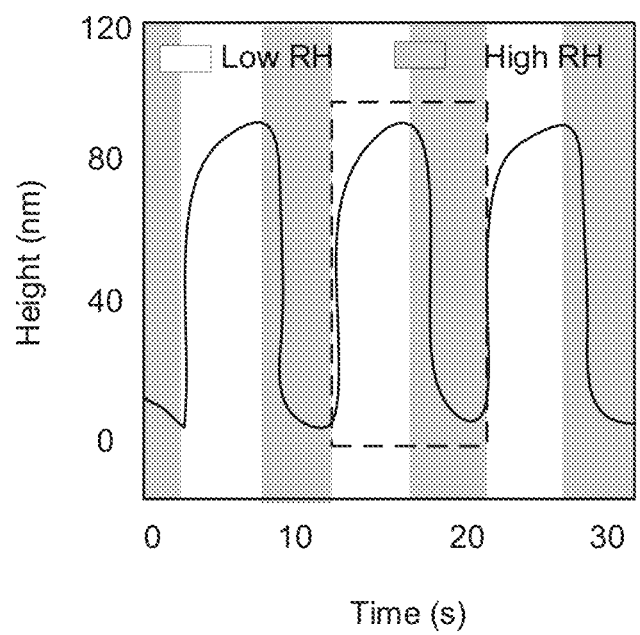
FIG. 17D and FIG. 17E show dynamic height changes of cell wall PG with a thickness of 473 nm show its fast WR speed under changing RHs. Cell wall PG's relaxation time constants of contraction and expansion are 0.12 s and 0.40 s, respectively.
Figure 17E:
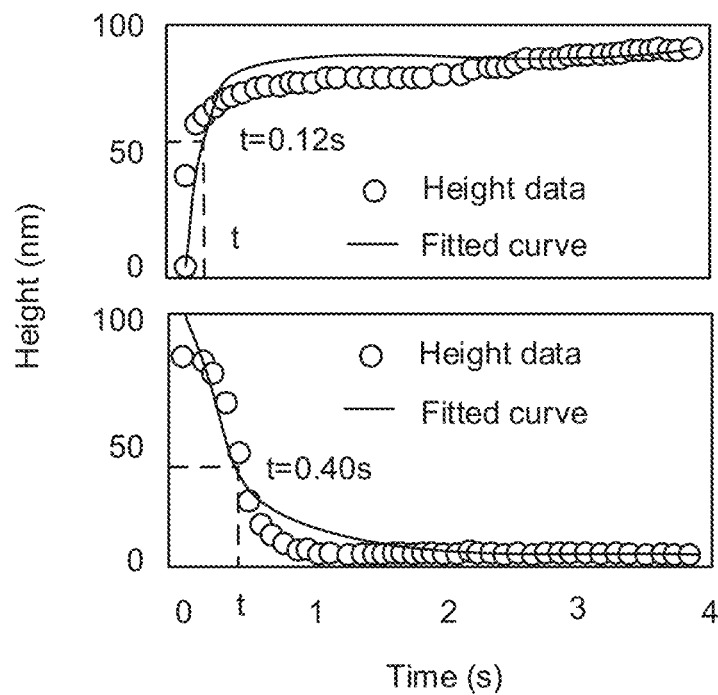

PG is also the main component of *B. subtilis*' vegetative bacterial cell walls (FIG. 14E). While cell wall PG is highly cross-linked by peptide stems (cross-linking ratios of 33% for cell wall PG and 6% for spore PG), it shares similar glycan chains and peptide stems with spore PG, and shows a similar hierarchical and stiff (Young's moduli are 4.49 GPa at 5% RH and 1.77 GPa at 90% RH) structure (FIG. 14F and FIG. 14G). Without wishing to be bound to any particular theory, *B. subtilis*' cell wall PG should also be water-responsive. Using the same AFM setup, cell wall PG's surface topographies were characterized under various RH levels and showed that cell wall PG expands dramatically (WR strain of 27.2%) when local RH is increased from 5% to 90% (FIG. 17A and FIG. 17B). Compared to spore PG, cell wall PG shows a smaller WR strain which directly correlates to its less water uptake of 21 wt % (FIG. 17C), potentially resulted from a denser structure owing to the higher cross-linking ratio. Nonetheless, cell wall PG and spore PG share similar strain vs. RH trends and water sorption isotherms, where an abrupt change occurs at ~80% RH (FIG. 15H, FIG. 16C, FIG. 17B and FIG. 17C). Cell wall PG also possesses a similar actuation that is highly reversible and extremely fast as that of spore PG (FIG. 16E and FIG. 17D). Notably, cell wall PG's dehydration speed (0.12 s) is faster than its hydration speed (0.4 s) (FIG. 17E), which could be due to more hydrophobic nature of its supramolecular network compared to that of spore PG.

Figure 17F:
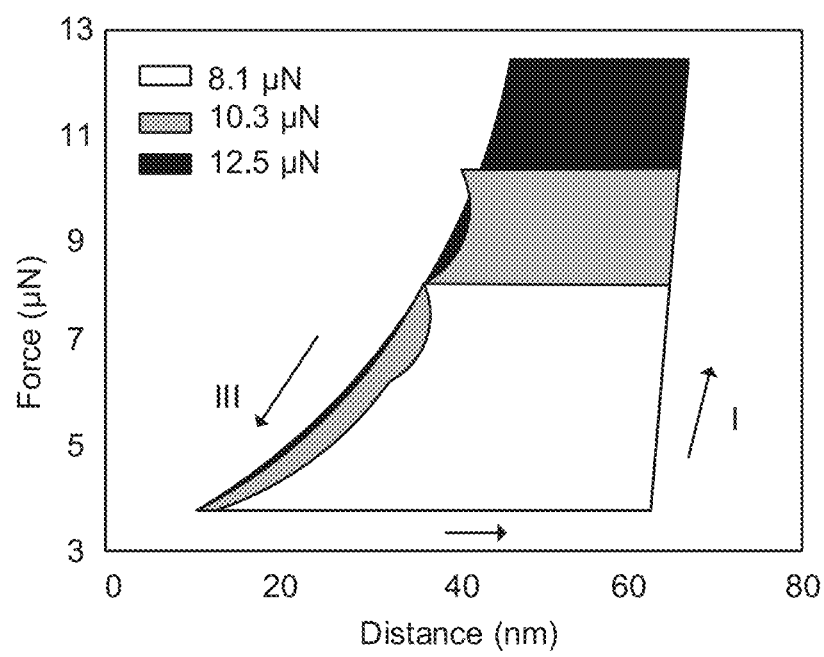
FIG. 17F is a graph of force vs. distance curves of cell wall PG during thermodynamic cycles with various applied forces and cycle times (8-12 s)
Figure 17G:
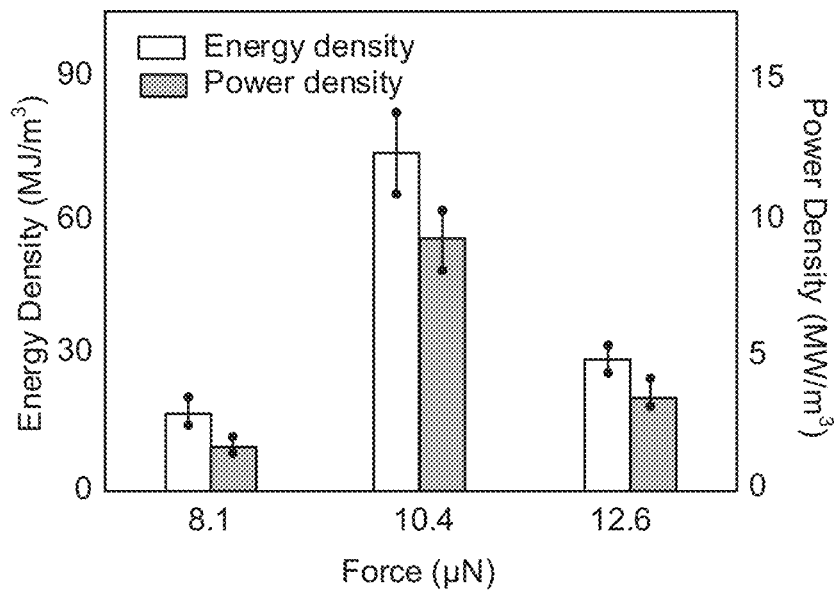
FIG. 17G is a graph showing energy and power densities of cell wall PG with different applied forces. Error bars represent standard errors calculated from five measurements.

Energy and power densities of cell wall PG were also measured by using the same thermodynamic cycle (FIG. 16H and FIG. 16J), where the applied force and duration in each stage were varied to maximize the energy and power output (FIG. 17F). Surprisingly, the cell wall PG's WR energy and power densities are extremely high and reach 72.6 MJ m$^{-3}$ and 9.1 MW m$^{-3}$, respectively (FIG. 17G and Table 2). Note that the total energy input (μ) relies on the amount of water exchange and water's chemical potential difference during hydration/dehydration processes, given by $$^{34}\mu = nR_i T \ln\left(\frac{a_1}{a_2}\right)$$

Figure 17H:
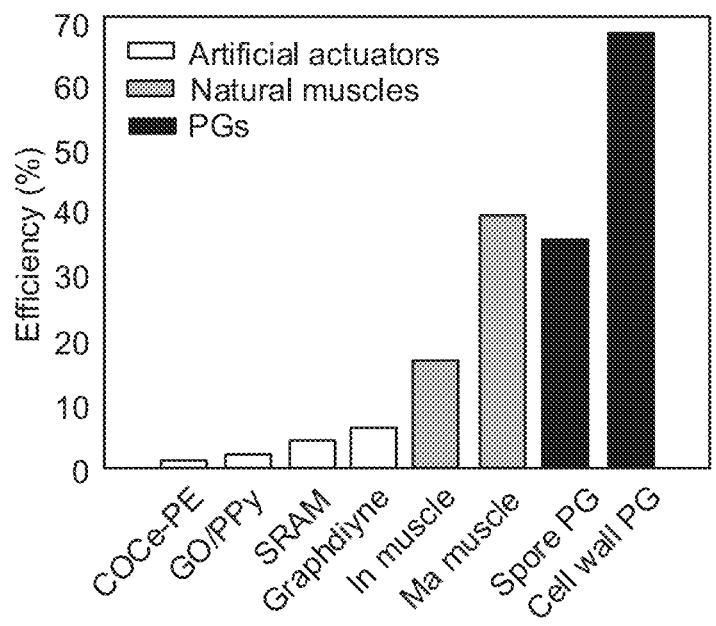
FIG. 17H is a graph of energy conversion efficiencies of spore PG, cell wall PG, and other actuators/muscles, including cyclic olefin copolymer elastomer-polyethylene (COCe-PE), graphene oxide/polypyrrole (GO/PPy) bilayer actuators, sheath-run artificial muscles (SRAM), graphdiyne actuators, insect muscles (In muscle), and mammalian muscles (Ma muscle)

(1), where $R_i$ is the ideal gas constant (8.314 J K$^{-1}$ mol$^{-1}$), T is the temperature (298.15 K), the $a_1$ and $a_2$ are activities of water vapor at two different RHs, and n is moles of water molecules involved in the energy conversion process. Spore and cell wall PG's energy conversion efficiencies are estimated to be 35.0% and 66.8%, respectively, which are comparable to efficiencies of mammalian muscles (~40%), and are much higher than those of recently reported actuators (~1.1%-6.0%) (FIG. 17H).

TABLE 2

WR properties of spore PG and cell wall PG

| | Strain (%) | Stiffness (GPa) | Response speed (s) | Energy density (MJ m$^{-3}$) | Power density (MW m$^{-3}$) | Maximal stress (MPa) | Efficiency (%) |
|---|---|---|---|---|---|---|---|
| Spore PG | 50.1 | 4.91 (dry) 1.77 (wet) | 0.24 (dehydration) 0.14 (hydration) | 59.9 | 7.1 | 354.6 | 35.0 |
| Cell wall PG | 27.2 | 4.49 (dry) 1.77 (wet) | 0.12 (dehydration) 0.40 (hydration) | 72.6 | 9.1 | 205.6 | 66.8 |

Cell wall PG's remarkable WR performance could relate to the anomalously high viscosity of water confined in PG's nanopores. Using the poroelastic theory and PG's relaxation time constant, pore water's viscosity was estimated to be ~3×10$^4$ Pa·s, ~10$^7$ times greater than that of bulk water. Such high viscosity shares similarities with recently observed evaporation-induced H-bonding strengthening of water confined in WR tripeptide crystals, where the H-bonding network effectively translates the chemical potential difference-induced osmotic pressure at the water/air interface to shrink their lattice structures that regains its original shape upon rehydration. Thus, it is very likely that, during evaporation, the highly viscous flow drags PG's pore surfaces to deform the entire structure, and efficiently transfer water's chemical potential to mechanical energy that stored in PG elastically. This hypothesis could explain fundamental reasons why high-performance WR materials usually require nano-porosity, which could lead to highly viscous flow to drag pore surfaces, and hierarchical structures with high mechanical stiffness and ductility that allow the structure to store and release a large amount of elastic energy.

Self-Adapting and Soft Gripper Systems Powered by Soft PG Muscles.

Figure 18A:
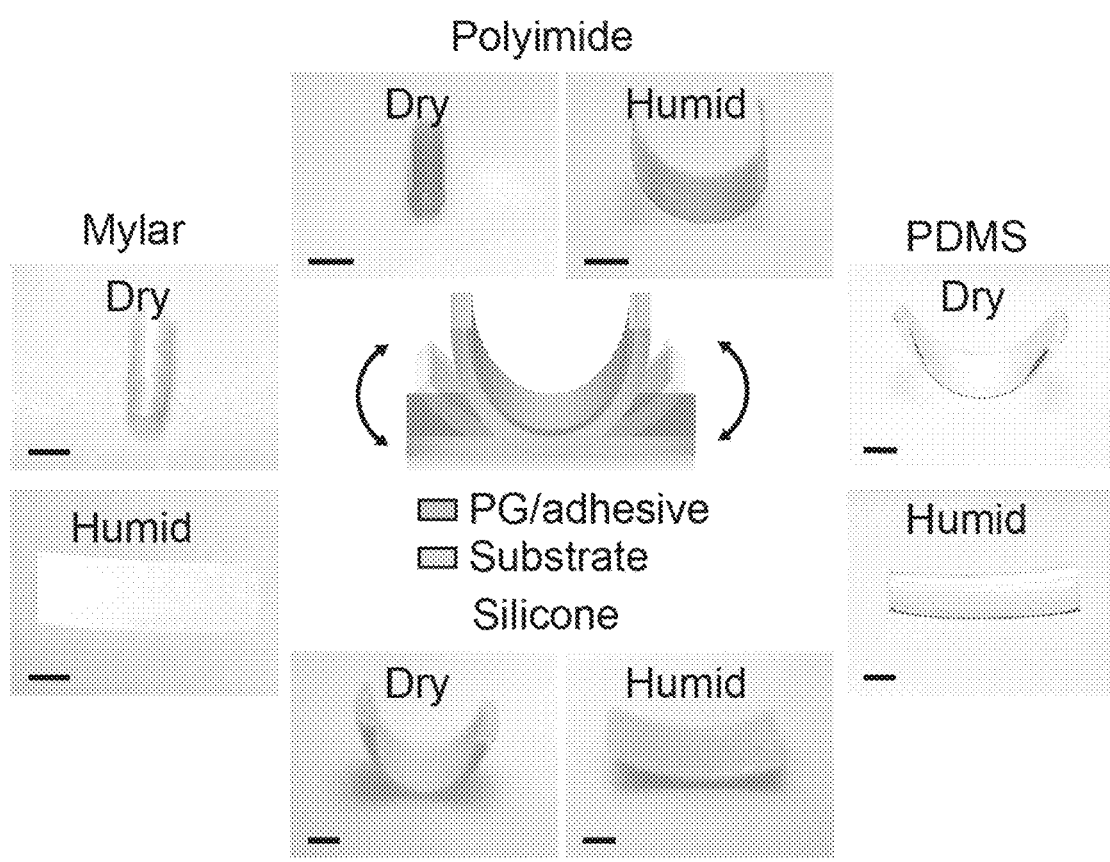
FIG. 18A depicts a PG/adhesive composite is coated on polymer substrates, including polyinide, Mylar, silicone, and PDMS, forming WR bilayer PG muscles that bend under dry conditions and straighten under humid conditions. Scale bar, 1 mm.

To demonstrate the potential of using PG as actuating components for macroscale engineering systems, centimeter-scale soft PG muscles were fabricated by simply mixing cell wall PG with a commercial adhesive (ELMER'S® glue) and depositing the PG/adhesive mixture solution on polymer substrates, including polyimide, Mylar, polymerized siloxanes (silicone), polydimethylsiloxane (PDMS), which are frequently used structural materials in soft robotics (FIG. 18A and Methods). After the PG/adhesive mixture dries out, the resulting bilayer structures that was comprised of an active WR PG/adhesive composite layer and a passive substrate layer reversibly bend and straighten when the local RH is alternated between 5% and 90%, respectively (FIG. 18A). By considering the elastic potential energy stored in these curved bilayer structures under dry conditions (while the ELMER'S® glue is not an ideal matrix material that can efficiently scale up PG's nanoscale WR actuation) the energy density of these PG/adhesive composites still reaches 3.04 MJ m$^{-3}$, nearly three orders of magnitude higher than that of the mammalian skeletal muscle (8 kJ m$^{-3}$).

Figure 18D:
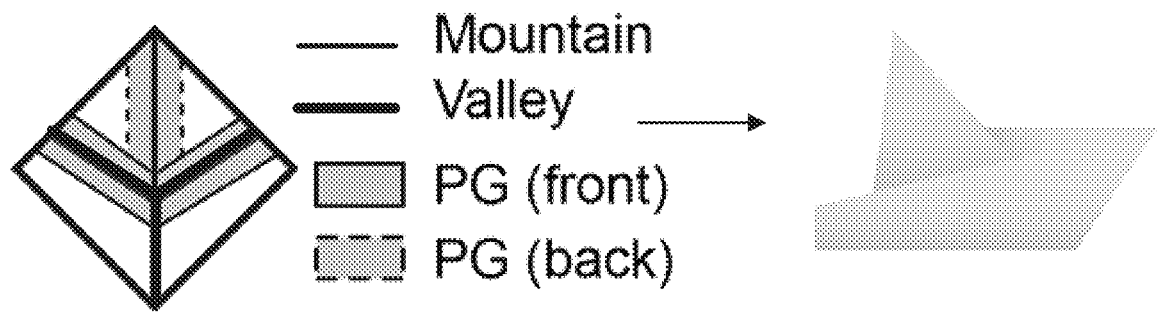
FIG. 18D and FIG. 18E show a polyimide-film-based origami boat with patterned PG/adhesive composites on both front and back of the boat surfaces can fold and unfold its structure under dry and humid conditions, respectively. Scale bar, 10 mm.
Figure 18E:
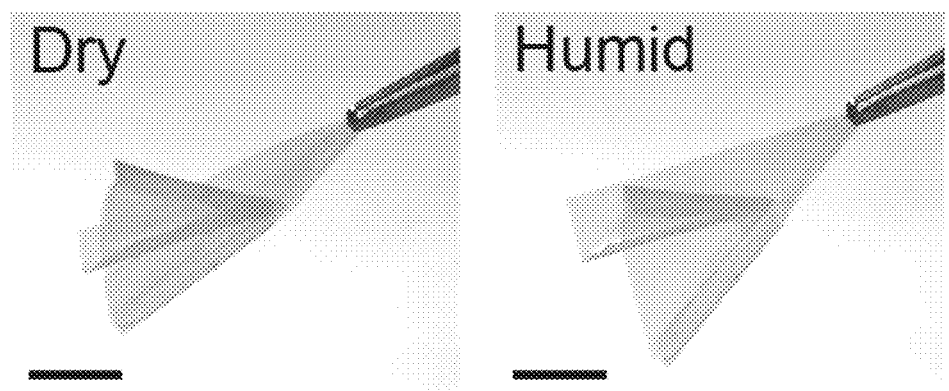
Figure 18G:
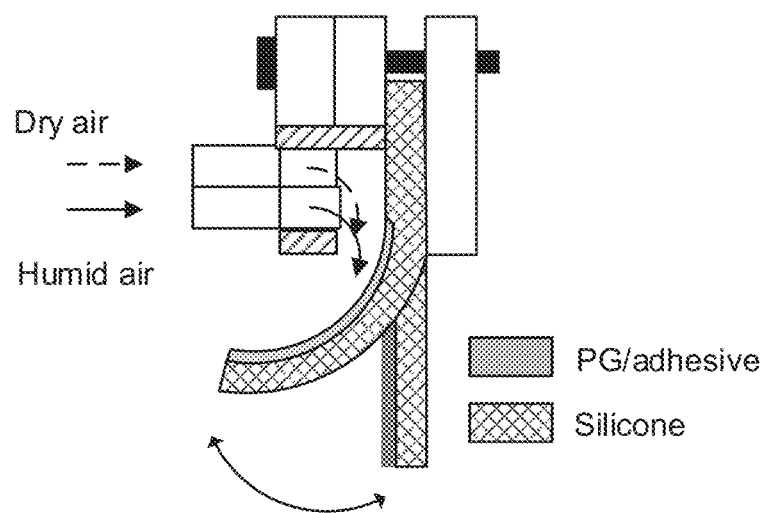
FIG. 18G and FIG. 18H show a soft PG/silicone muscle bends and straightens, programmed by an RH-control system that locally delivers humid or dry air to the PG/adhesive layer. Scale bar, 5 mm.
Figure 18H:
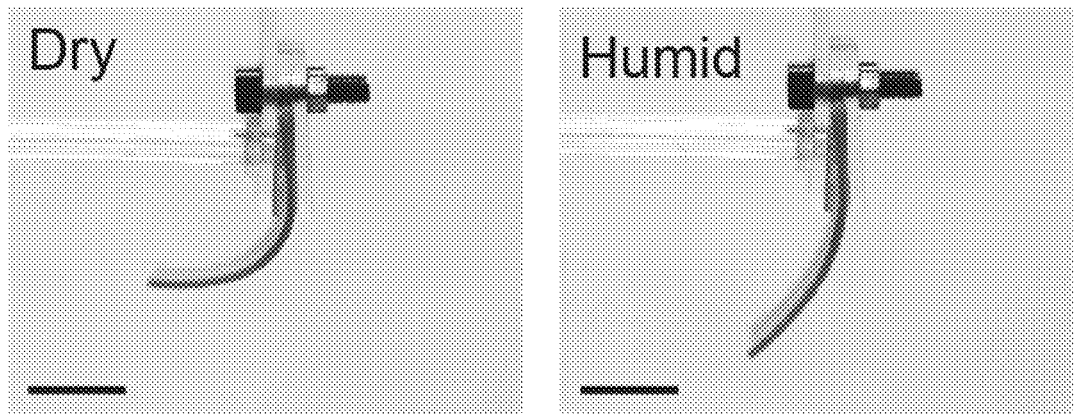
Figure 18I:
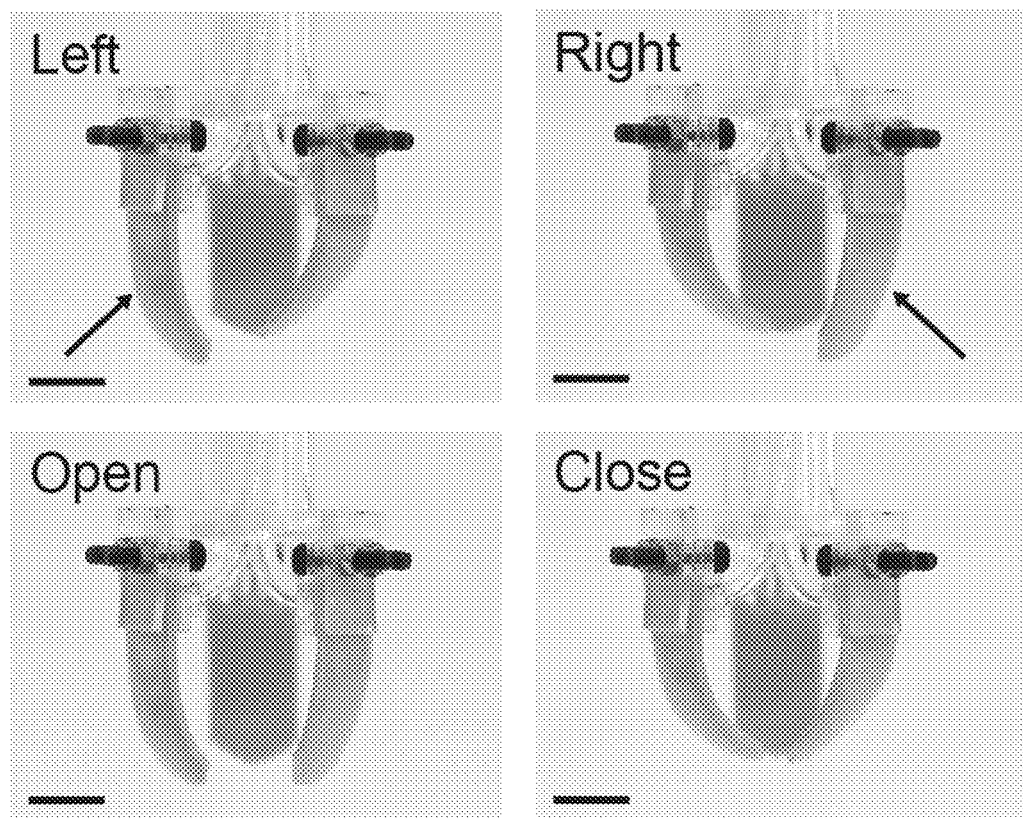
FIG. 18I depicts a soft gripper consists of three PG/silicone muscles that can be controlled independently. Scale bar, 5 mm.
Figure 18J:
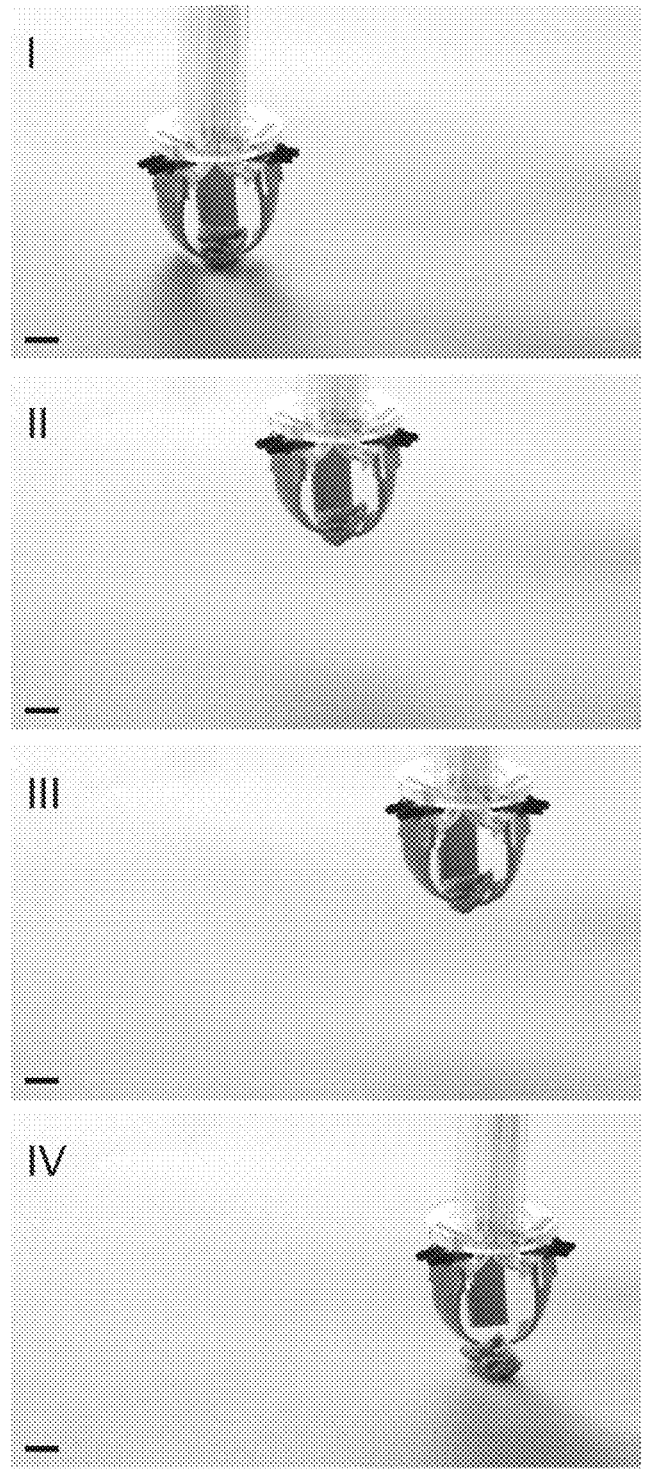
FIG. 18J shows the soft gripper grasps (I), carries (II and III), and releases (IV) a piece of cereal. Scale bar, 5 mm.

Using these soft PG muscles, origami structures were created that self-adapt to changing environments that trigger their two-dimensional (2D) to three-dimensional (3D) structural transformations. For instance, a precut Mylar film with patterned PG/adhesive composites can morph itself into a cubic structure as pre-condensed water droplets on its surface evaporate, when the local environment changes from a humid condition to a dry condition (FIG. 18B and FIG. 18C, Methods). A simple origami boat was folded on which certain edges were coated with PG/adhesive composites (FIG. 18D) to maintain the origami a 2D structure under ambient conditions (~30% RH) (FIG. 18E). When the folded boat touches the surface of water, it autonomously expanded to a 3D boat within 16 seconds and then floated (FIG. 18F and Methods). In addition to these 2D to 3D transformations that passively triggered by environmental changes, soft PG muscles were equipped with portable RH-control systems where low-pressure air with programmed RHs and speeds can be locally delivered to the PG/adhesive layer, allowing on-demand actuation of these muscles (FIG. 18G, FIG. 18H and Methods). Using such systems, a soft gripper was constructed where individual PG-muscle-based fingers are controlled independently (FIG. 18I and Methods). With programmed signals, the soft gripper can grasp, carry, and release a piece of cereal under ambient conditions (FIG. 18J).

DISCUSSION

Our findings of *B. subtilis* PG's extraordinary WR performance, including its extremely high energy/power density and efficiency, suggest PG's great potential as actuation or energy conversion building blocks to develop powerful actuators and artificial muscles that advance existing engineering systems, as well as enable new applications. For example, the disclosed soft PG-muscle-based passive origami structures and actively controllable grippers provide possible strategies of using WR actuators for real-world applications. Given soft PG muscles' advantages in operation principles, including driving mechanisms, low power consumptions, and precise actuation, they could not only improve existing soft robotics and exoskeletons that usually require high-pressure gas/liquid and high voltages/powers, but also find possibilities in driving miniaturized systems that work in small structures.

PG's forceful WR actuation also sheds light on elucidating fundamental mechanisms of evaporation-induced material deformations, which look simple in concept; however, the energy conversion and transfer processes are very complex. The observed super-viscous nanoconfined water, together with a highly stiff solid network, provide insights into how natural materials efficiently translate nanoscale water-water and water-structure interactions to mechanical deformations, and could serve as a guideline for the rational design of large-scale synthetic WR structures.

Methods 2

Preparation of B. subtilis Vegetative Cells and Spores

The growth and sporulation of B. subtilis were conducted by adding 1 mL of spore suspension (BGA, Sigma-Aldrich) in 200 mL BD DIFCO® nutrient broth$_{(aq)}$, consisting of 3.2 g of Difco powder, 0.4 g of KCl, 0.125 g of $MgSO_4 \cdot 7H_2O$, 47.2 mg of $Ca(NO_3)_2 \cdot 4H_2O$, 0.2 g of glucose, 0.44 mg of $FeSO_4 \cdot 7H_2O$, and 1 mg of $MnCl_2$. All chemicals were purchased from Fisher Scientific. The culture was incubated on a hot plate (ISOTEMP$^T$®, FISHERBRAND®) at 37° C. and aerated vigorously with a magnetic stir bar. After 19 hours, vegetative cells were harvested from the culture by centrifuging the culture at 14,000×g for 8 minutes and collecting the pellet. After four days, spores were isolated from the culture that comprised a mixture of spores, vegetative cells, and cell debris. All solid components in the solution were washed twice by centrifuging the culture at 10,000×g for 3 minutes and resuspending the pellet in purified water (Milli-Q). Subsequently, cell debris was removed that are smaller than spores by pelleting the suspension at 455× g for 7 minutes and resuspending it in purified water for five times. Finally, vegetative cells that are much bigger than spores were entirely removed by centrifuging the suspension at 169× g for 5 minutes, leaving purified spores in the supernatant (FIG. 15A).

Spatial Distributions of PG in Spores

Proteins and lipids in spores were cross-linked to preserve the geometries of spores during invasive spatial distribution analysis. To cross-link spores' proteins, spore pellets were rinsed for 5 min using a solution consisting of 4% glutaraldehyde and 0.1 M cacodylate buffer (pH 7.4). Spore pellets were then rinsed for 30 min using another solution consisting of 2% aqueous osmium tetroxide and 0.1 M cacodylate buffer (pH 7.4) to fix both proteins and lipids. After rinsing the pellet with DI water for three times (5 min each), water in spores was removed by rinsing the sample with ethanol of increasing concentrations (30%, 40%, and 50%). To enhance the contrast of spores' components in SEM images, the sample was soaked in a solution consisting of 1% uranyl acetate and 50% ethanol for 30 min, and then rinsed with ethanol of increasing concentrations (50%, 70%, 80%, 90%, 100%, 100%, and 100%) to replace water with ethanol completely. To infiltrate the pellet with the resin solution, which has a formula of 20 mL EMBed-812, 9 mL dodenyl succinic anhydride (DDSA), and 12 mL methyl-5-norbornene-2,3-dicarboxylic anhydride (NMA), the pellet was rinsed with 100% propylene oxide (PO) for 5 min for three times, and then rinsed the pellet with increasing concentration of resin (50%, 70%, and 100% resin solution in PO) for 1 hour each. The pellet was transferred into a Beem capsule (EMS) and filled the capsule with 15 mL resin solution having a formula of 20 mL EMBed-812, 9 mL DDSA, 12 mL NMA, and 700 μL 2,4,6-Tri(dimethylaminomethyl)phenol (DMP-30). The capsule was left open under vacuum for two hours to degas the resin, and then stored in an oven at 60° C. for two days. All chemicals were purchased from Electron Microscopy Sciences. To expose spores for SEM imaging, an ultramicrotome (Ultracut E, Reichert-Jung) was used to slice the sample until spores were visible by an optical microscope (Stereo microscope, American Optical Corporation). A focused ion beam—scanning electron microscope system (FIB-SEM, FEI Helios) was used to mill the sample and obtain serial cross-section SEM images. During the milling and imaging process, 422 cross-section images with 20 nm slice thickness were automatically collected using Auto Slice & View software in the FIB-SEM system. To create a 3D map that shows PG's spatial distributions, a 3D reconstruction software (Avizo) was used to stack and align the collected images. To analyze spores' components, a fast Fourier transform (FTT) filter was used to enhance the contrast and reduce the background noise of SEM images. The coat, PG, and core were then determined based on the contrast of these images. Using this method, PG's spatial distributions was analyzed in 85 spores.

PG Preparation

To isolate PG from B. subtilis spores, 55 mg of spores were added to 1 mL of protein denaturation solution, consisting of 50 mM Tris-HCl (pH 8), 8 M urea, 35 mM sodium dodecyl sulfate (SDS), and 50 mM dithiothreitol (DTT), and incubated for 2 hours at 37° C. The spores were pelleted and repeated the denaturation process once to increase the extent of denaturation. The denatured spores were washed three times with DI water, resuspended in 1 mL of 0.05 g mL$^{-1}$ trichloroacetic acid (TCA) solution, and boiled at 95° C. for 6 minutes. Subsequently, the sample was pelleted (14,594×g for 3 min) and resuspended it in a 0.5 M Tris-HCl (pH 9.5) solution to remove the TCA. The sample was then pelleted (14,594×g for 3 min), resuspended in a solution consisting of 50 mM Tris-HCl (pH 8), 105 mM SDS, and 50 mM DTT solution, and boiled for 20 minutes. The whole process starting from the treatment with 0.05 g mL$^{-1}$ TCA was repeated once to remove non-PG components in the spore completely. To isolate cell wall PG from B. subtilis vegetative cells, 55 mg of cells were added to 10 mL of 347 mM SDS, boiled for 3 hours, and washed five times with DI water. The resulting cells were then treated with 10 mL of 2 mg mL$^{-1}$ pronase (Sigma-Aldrich) at 50° C. for 2 hours, which were repeated once. After seven times of DI water washing, the resulting cell wall PG was lyophilized using a centrifugal vacuum concentrator (HyperVAC, Gyrozen). All the chemicals mentioned in this section were purchased from Fisher Scientific unless specifically noted.

Spore PG's Molecular Structure Characterization

A liquid chromatography-electrospray ionization-mass spectrometry (LC-ESI-MS) was used to characterize isolated spore PG's molecular structure. To hydrolyze isolated spore PG, the spore PG was incubated with mutanolysin enzyme (Sigma-Aldrich) in 1 mL of 25 mM sodium phosphate (pH 5.6) at 37° C. for 15 hours and then boiled it on a hot plate for 3 minutes to stop the hydrolysis. After centrifuging the solution at 14,000×g for 8 min, the supernatant that contains digested PG was collected and stored at −20° C. To run the LC-ESI-MS test, the maXis-II UHR-ESI-QqTOF mass-spectrometry (Bruker Daltonics) coupled to an Ultimate-3000 UHPLC system (Fisher Scientific) was used. To separate various hydrolysates by liquid chromatography, the elution buffer gradients used were: 0-5 min isocratic start at 5% solvent B (Acetonitrile, 0.25% formic acid) and 95% solvent A (Water, 0.25% formic acid); 5-20 min gradient to 95% B; 20-25 min isocratic mode at 95% B. The sample was introduced by single injections of 50 µL supernatant into the ZORBAX 300SB-C18 column 2.1 mm×100 mm (Agilent) at 30° C. with a flow rate of 200 µL min$^{-1}$.

Water Sorption Isotherms

Water sorption isotherms of PGs and spores were measured by a Dynamic Vapor Sorption (DVS) system (DVS Intrinsic, Surface Measurement Systems) at a constant temperature of 25° C. Samples of ~9 mg of spores, ~3 mg of cell wall PG (Sigma-Aldrich), and ~0.7 mg of isolated spore PG were separately loaded in the DVS chamber for characterization. When the RH was cycled between 5% and 90%, masses of PGs and spores were measured in real-time. To obtain equilibrium water sorption isotherms over RH levels, each RH level was set to either maintain for at least 20 min or change to the next level after the mass change rate was lower than 0.00005 mg min$^{-1}$ for 5 min (the longer durations were chosen). For each sample, three cycles of water sorption isotherms were collected and analyzed by the DVS Control Software.

WR Strain Characterization

An AFM system (Multimode 8, Bruker) was used to characterized PG's WR strain. The local RH near PG samples was controlled by supplying dry or humid air to keep certain RHs. A commercial RH sensor (HIH-4021-003, Honeywell) was placed near PG samples to monitor the local RH continuously. After RH was stabilized at a certain level, PG's topographies were measured by using an AFM probe with a tip radius of ~2 nm (SCANA SYST-AIR, Bruker). To analyze PG's WR strain, PG's topographies were compared at various RH levels to its topography at 5% RH.

WR Speed Characterization

A customized AFM system (Multimode 8, Bruker) was used to measure PG's WR speed by tracking the real-time deformation of PG in response to RH changes. RH near PG samples was rapidly alternated between 5% and 90% by dry or humid air, controlled by a solenoid valve (VK332Y-6G-M5, SMC) programmed using LabVIEW (National Instruments). PG's dynamic height change was measured by monitoring the vertical movement of the sample stage while an AFM probe (LRCH-250, Team Nanotec) maintained a minimum contact force of ~1 µN on PG's top surface. During the experiment, the noise of the AFM measurement was controlled to be less than 7 nm. The relaxation time constant ($\tau$) of PG's WR speed was quantified by fitting PG's height (h) vs. time (t) curves to exponential decay/growth functions, given by:

$$h(t)=(h_{max}-h_{min})e^{-t/\tau}+h_{min} \quad (S1)$$

$$h(t)=-(h_{max}-h_{min})e^{-t/\tau}+h_{max} \quad (S2)$$

where $h_{max}$ and $h_{min}$ are heights of hydrated and dehydrated PG, respectively.

Stiffness Characterization

The stiffness of PG was characterized by performing the AFM nano-indentation using a probe (NCHV, Bruker) with a spring constant of 42 N m$^{-1}$ and a tip radius of 16 nm. During the nano-indentation, we controlled the RH to be stabilized at various levels before monitored the forces and indentation depths. The resulting force vs. indentation depth curves were subsequently analyzed by using the Hertz model, given by $$(F)^{2/3} = \left(\frac{4}{3}\frac{E_{PG}}{(1-v)^2}\sqrt{R_{tip}}\right)^{2/3} d \quad (S3)$$

where F is the indentation force, $E_{PG}$ is the Young's modulus, v is the Poisson's ratio (0.32)[16,46], $R_{tip}$ is the tip radius, and d is the indentation depth. PG's Young's moduli (stiffness) at RHs from 5% to 90% are shown in U.S. Provisional Patent Application 63/161,190 (fled Mar. 15, 2021), the content of which is hereby incorporated by reference.

Energy/Power Densities Characterization

PG's WR energy and power densities were measured by using the customized AFM and a thermal dynamic cycle that was previously used to measure spores' energy density (FIG. 16H-K, FIG. 17F-G). To create the thermodynamic cycle, we controlled the RH levels and the force applied to PG samples through an AFM probe (LRCH-250, Team Nanotec) while monitoring the indentation depth by using a high-speed data acquisition card (PCI-6115, National Instruments) and an analog-summing amplifier (SIM980, Stanford Research Systems) controlled by a LabVIEW program. To probe PG's maximum energy and power output, the magnitude of the applied force and the duration for each stage was adjusted using the LabVIEW program. The fill thermodynamic cycle was repeated at least three times for each measurement. The energy density was calculated by dividing the work done to the effective volume. The power densities were calculated by considering the durations (8-12 sec) of individual thermodynamic cycles.

Soft PG Muscles

Soft PG muscles were fabricated by depositing aqueous PG/adhesive solutions on thin films, including 12.7 µm thick polyimide (McMaster-Carr), 12 µm thick Mylar (Premier Lab Supply), 0.5 mm thick Polydimethylsiloxane (PDMS, Fisher Scientific), and 0.5 mm thick silicone (OOMOO® 25, Smooth-On). All the films were first cut into 3 mm×6 mm pieces, cleaned by ethanol, and treated with plasma (75% argon and 25% oxygen, Fischione M11070 NanoClean). Then, 10 µL PG/adhesive solutions that consist of 14.04 mg mL$^{-1}$ PG and 4.29 mg mL$^{-1}$ adhesive (ELMER'S® glue) were deposited on top surfaces of these films and allowed to dry at 4° C. under ~90% RH to form bilayer PG muscles. To test their WR behaviors, these bilayer muscles were placed in a homemade environmental-control chamber where RH can be varied from 5% to 90%. These bilayer muscles' curvatures at high and low RHs were imaged using a digital camera (Canon EOS Rebel SL1) and analyzed using an image processing software (Image J, NIH image). Energy densities of PG/adhesive composites in these bilayer muscles are estimated by considering elastic energy stored in curved structures at 5% RH and volumes of PG/adhesive composites.

Preparation of Origami Structures

To prepare the origami cube, a 12 µm thick Mylar film was hand-cut into a cubic structure's expanded form, and then 0.5 mm×5 mm PG/adhesive composites were coated on five edges (FIG. 18B), allowing fully close of the cube at ~30% RH. The origami boat was fabricated by first folding a 2 cm×2 cm polyimide film with a thickness of 8 µm (SPEX SamplePrep LLC) following the mountain crease lines and the valley crease lines in FIG. 18D. Subsequently, 1 mm wide PG/adhesive composites were coated on both front and back folding edges (FIG. 18D), allowing the boat to maintain a 2D structure at ~30% RH.

Preparation of Soft Grippers

The PG-muscle-based soft gripper was prepared by assembling three 6 mm×15 mm PG/silicone muscles to portable RH-control systems, consisting of acrylic sheets (McMaster-Carr), solenoid valves (V100, SMC), and 2 mm (O.D.) tubing (SMC). To prepare the RH-control system, acrylic sheets were cut into designed shapes by using a laser cutter (VLS4.60, Universal Laser) and then acrylic pieces were assembled with the tubing by using screws and bolts (McMaster-Carr) as shown in FIG. 18G. After being attached to the RH-control system, individual PG/silicone muscles are independently controlled by injecting dry or humid air onto PG/adhesive sides of soft muscles using solenoid valves that are programmed by an Arduino microcontroller (Nano V3.0 Plus, ELEGOO).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for actuating an artificial muscle, the method comprising:
   exposing a flexible substrate to air with a first humidity, wherein the flexible substrate comprises a surface that is coated with a peptidoglycan from a bacterial cell wall; and
   exposing the substrate to air with a second humidity, different than the first humidity, wherein the second humidity causes a change in hygroscopic expansion or contraction of the peptidoglycan, thereby actuating the substrate.

2. The method as recited in claim 1, wherein the peptidoglycan is peptidoglycan from the bacterial cell wall of *Bacillus subtilis*.

3. The method as recited in claim 1, wherein peptidoglycan is mixed with a secondary component selected from a group consisting of an epoxy, a cellulose, a collagen and a polymer adhesive.

4. The method as recited in claim 1, wherein the peptidoglycan is cross-linked by a crosslinker.

5. The method as recited in claim 1, wherein the hygroscopic expansion and contraction of the peptidoglycan is transferred to a secondary movement selected from rotational movement, expansion, contraction or a combination thereof.

6. The method as recited in claim 1, wherein the flexible substrate has a thickness between 500 nm and 5 mm.

7. The method as recited in claim 1, wherein the flexible substrate has a Yong's modulus between 10 kPa and 10 GPa.

8. A method for actuating an artificial muscle, the method comprising:
   exposing a flexible substrate to air with a first humidity, wherein the flexible substrate comprises a surface that is coated with a peptidoglycan;
   exposing the substrate to air with a second humidity, different than the first humidity, wherein the second humidity causes a change in hygroscopic expansion or contraction of the peptidoglycan, thereby actuating the substrate; and
   wherein the peptidoglycan is cross-linked by an amphiphilic peptide stem.

9. A method for actuating an artificial muscle, the method comprising:
   exposing a flexible substrate to air with a first humidity, wherein the flexible substrate comprises a surface that is coated with a peptidoglycan;
   exposing the substrate to air with a second humidity, different than the first humidity, wherein the second humidity causes a change in hygroscopic expansion or contraction of the peptidoglycan, thereby actuating the substrate; and
   wherein the peptidoglycan is cross-linked by a crosslinker selected from a group consisting of glutaraldehyde, O,O'-Bis[2-(N-Succinimidyl-succinylamino)ethyl] polyethylene glycol, and BS(PEG)9 (PEGylated bis (sulfosuccinimidyl)suberate).

10. An artificial muscle comprising:
    a flexible substrate with a surface that is coated with a peptidoglycan from a bacterial cell wall, the peptidoglycan having with a thickness between 500 nm and 5 mm, wherein humid air contacting the peptidoglycan causes hygroscopic expansion and contraction of the peptidoglycan, thereby actuating the substrate.

11. The artificial muscle according to claim 10, wherein the peptidoglycan is peptidoglycan from the bacterial cell wall of *Bacillus subtilis*.

12. The artificial muscle according to claim 10, wherein peptidoglycan is mixed with a secondary component selected from a group consisting of an epoxy, a cellulose, a collagen and a polymer adhesive.

13. The artificial muscle according to claim 10, wherein the peptidoglycan is cross-linked by a crosslinker.

14. The artificial muscle according to claim 10, wherein the hygroscopic expansion and contraction of the peptidoglycan in the artificial muscle relies on the changes in local relative humidity level or temperature.

15. The artificial muscle according to claim 10, wherein the hygroscopic expansion and contraction of the peptidoglycan is transferred to a secondary movement selected from rotational movement, translational movement, expansion, contraction or a combination thereof.

16. An artificial muscle comprising:
    a flexible substrate with a surface that is coated with a peptidoglycan with a thickness between 500 nm and 5 mm, wherein humid air contacting the peptidoglycan causes hygroscopic expansion and contraction of the peptidoglycan, thereby actuating the substrate; and
    wherein the peptidoglycan is cross-linked by an amphiphilic peptide stem.

17. An artificial muscle comprising:
    a flexible substrate with a surface that is coated with a peptidoglycan with a thickness between 500 nm and 5 mm, wherein humid air contacting the peptidoglycan causes hygroscopic expansion and contraction of the peptidoglycan, thereby actuating the substrate; and
    wherein the peptidoglycan is cross-linked by a crosslinker selected from a group consisting of glutaraldehyde, O,O'-Bis[2-(N-Succinimidyl-succinylamino)ethyl] polyethylene glycol, and BS(PEG)9 (PEGylated bis (sulfosuccinimidyl)suberate).

* * * * *